United States Patent
Patankar et al.

(10) Patent No.: US 10,210,598 B2
(45) Date of Patent: Feb. 19, 2019

(54) ELECTRONIC DEVICE FOR DISPLAYING A PLURALITY OF IMAGES AND METHOD FOR PROCESSING AN IMAGE

(71) Applicant: Samsung Electronics Co., Ltd., Suwon-si, Gyeonggi-do (KR)

(72) Inventors: Anish Anil Patankar, Bangalore (IN); Joy Bose, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 15/172,968

(22) Filed: Jun. 3, 2016

(65) Prior Publication Data

US 2016/0371815 A1    Dec. 22, 2016

(30) Foreign Application Priority Data

Jun. 17, 2015  (IN) ............................ 3036/CHE/2015
Jan. 18, 2016  (IN) ............................ 3036/CHE/2015
May 16, 2016  (KR) ........................ 10-2016-0059731

(51) Int. Cl.
  *G06K 9/42*   (2006.01)
  *G06T 3/40*   (2006.01)
  *G06K 9/62*   (2006.01)
  *H04N 7/15*   (2006.01)

(52) U.S. Cl.
  CPC .......... *G06T 3/4007* (2013.01); *G06K 9/6202* (2013.01); *H04N 7/15* (2013.01)

(58) Field of Classification Search
  CPC ....... G06T 3/4007; H04N 7/15; G06K 9/6202
  USPC ....... 382/100, 167, 192, 276, 118, 115, 103, 382/128, 180, 181, 190, 254, 274, 224, 382/298
  See application file for complete search history.

(56) References Cited

U.S. PATENT DOCUMENTS

| 6,456,745 B1 * | 9/2002 | Bruton ................. G06T 3/4084 382/276 |
| 6,469,718 B1 * | 10/2002 | Setogawa ............. G06F 3/0482 348/E5.105 |
| 7,272,267 B1 | 9/2007 | Nakajima |

(Continued)

FOREIGN PATENT DOCUMENTS

| EP | 2 105 930 B1 | 12/2013 |
| EP | 2 779 099 A2 | 9/2014 |

(Continued)

OTHER PUBLICATIONS

Chen et al., Tiling Slideshow.

(Continued)

*Primary Examiner* — Sheela C Chawan
(74) *Attorney, Agent, or Firm* — Jefferson IP Law, LLP

(57) ABSTRACT

An electronic device and a method for processing an image are provided. The electronic device includes a display configured to display a plurality of images on a screen and a processor configured to detect a number of objects included in each of the plurality of images, determine a scaling factor for each of the plurality of images based on the detected number of objects, resize one or more images among the plurality of images based on the determined scaling factor for each of the plurality of images, and control at least one of a layout and a display order of the plurality of images based on the resized images and control the display to display the plurality of images.

18 Claims, 40 Drawing Sheets

(56) References Cited

U.S. PATENT DOCUMENTS

| | | | |
|---|---|---|---|
| 7,693,413 B2 | 4/2010 | Sueyoshi et al. | |
| 8,166,391 B2 | 4/2012 | Kaneko | |
| 8,384,791 B2 * | 2/2013 | Porter | G06K 9/00295 |
| | | | 348/222.1 |
| 8,612,851 B2 | 12/2013 | Kiefer, III et al. | |
| 8,763,908 B1 * | 7/2014 | Feldman | G06K 7/1443 |
| | | | 235/462.09 |
| 8,836,728 B2 * | 9/2014 | Tan | H04N 21/45455 |
| | | | 345/660 |
| 8,963,953 B2 * | 2/2015 | Agar | H04N 1/00167 |
| | | | 345/629 |
| 9,383,916 B2 * | 7/2016 | Srinivasan | G06F 3/04883 |
| 9,727,547 B2 * | 8/2017 | Migos | G06F 17/241 |
| 2004/0076342 A1 | 4/2004 | Wolff et al. | |
| 2004/0165000 A1 | 8/2004 | Nagahashi et al. | |
| 2006/0192784 A1 | 8/2006 | Yamaji et al. | |
| 2006/0244765 A1 | 11/2006 | Isomura et al. | |
| 2007/0019943 A1 | 1/2007 | Sueyoshi et al. | |
| 2007/0064278 A1 | 3/2007 | Sugimoto | |
| 2007/0130537 A1 | 6/2007 | Chiu | |
| 2009/0116752 A1 | 5/2009 | Isomura et al. | |
| 2011/0074824 A1 | 3/2011 | Srinivasan et al. | |
| 2012/0087582 A1 * | 4/2012 | Bauchot | G06T 3/4084 |
| | | | 382/167 |
| 2013/0259381 A1 | 10/2013 | Srinivasan et al. | |
| 2014/0098140 A1 | 4/2014 | Iran et al. | |
| 2014/0123193 A1 | 5/2014 | Coudurier et al. | |
| 2014/0149926 A1 | 5/2014 | Min | |
| 2014/0192081 A1 | 7/2014 | Jin et al. | |
| 2014/0365905 A1 | 12/2014 | Chedeau | |
| 2015/0002527 A1 | 1/2015 | Chedeau et al. | |
| 2015/0085114 A1 | 3/2015 | Ptitsyn | |
| 2015/0116503 A1 | 4/2015 | Fredlund et al. | |
| 2015/0161466 A1 | 6/2015 | Welinder et al. | |

FOREIGN PATENT DOCUMENTS

| | | |
|---|---|---|
| JP | 2000-165648 A | 6/2000 |
| JP | 2002-142092 A | 5/2002 |
| JP | 2007-28555 A | 2/2007 |
| JP | 2007-104563 A | 4/2007 |
| JP | 2008-301264 A | 12/2008 |
| JP | 2009-15540 A | 1/2009 |
| JP | 2010-72934 A | 4/2010 |
| KR | 10-2007-0059935 A | 6/2007 |
| KR | 10-1049813 B1 | 7/2011 |
| KR | 10-2014-0023596 A | 2/2014 |
| KR | 10-2014-0090330 A | 7/2014 |
| KR | 10-2014-0110237 A | 9/2014 |
| KR | 10-2014-0130799 A | 11/2014 |
| KR | 10-2015-0070607 A | 6/2015 |
| WO | 02/29542 A1 | 4/2002 |
| WO | 2014/014855 A1 | 1/2014 |

OTHER PUBLICATIONS

Bogdan Alexe, Thomas Deselaers, and Vittorio Ferrari, What is an object?, Computer Vision and Pattern Recognition (CVPR), 2010 IEEE Conference on. IEEE, 2011.

* cited by examiner

COLLAGE OF IMAGES

RESIZED IMAGES BASED ON NUMBER OF OBJECTS

MULTI-PARTY VIDEO CONFERENCE

RESIZED IMAGES BASED ON NUMBER OF PARTICIPANTS

AFTER ONE PERSON LEAVES

IMAGES ON SOCIAL NETWORKING SITE (SNS)

1200

1410

ELECTRONIC DEVICE FOR DISPLAYING A PLURALITY OF IMAGES AND METHOD FOR PROCESSING AN IMAGE

CROSS-REFERENCE TO RELATED APPLICATIONS

This application claims the benefit under 35 U.S.C. § 119(a) of a Korean patent application filed on May 16, 2016 in the Korean Intellectual Property Office and assigned Serial number 10-2016-0059731, and of an Indian Provisional patent application filed on Jun. 17, 2015 in the Indian Intellectual Property Office and assigned Serial number 3036/CHE/2015, and of an Indian Patent Application filed on Jan. 18, 2016 in the Indian Intellectual Property Office and assigned Serial number 3036/CHE/2015, the entire disclosure of each of which is hereby incorporated by reference.

TECHNICAL FIELD

The present disclosure relates to an image processing operation of an electronic device. More particularly, the present disclosure relates to an electronic device which resizes and displays a plurality of images according to the number of objects included in each of the plurality of images and a method for processing an image.

BACKGROUND

Many electronic devices, such as, smart phones and tablet computers, have a camera for capturing images. When using the electronic device to view the captured images, the electronic device displays all the captured images in the same size. When all the captured images are displayed in the same size, a user cannot see clearly those images where there is a lot of information (for example, many people in the image). When thumbnails are shown in a photo album, the thumbnail images are not resized such that the information in the thumbnail images can be fully perceived by the user. Accordingly, there remains a need of mechanism for resizing images based on information or content present in each of the images and reordering and displaying the images.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for resizing and displays a plurality of images based on the number of objects included in each image to provide a user with information in each image more clearly and a method thereof.

In accordance with an aspect of the present disclosure, an electronic device for processing an image is provided. The electronic device includes a display configured to display a plurality of images on a screen and a processor configured to detect a number of objects included in each of the plurality of images, determine a scaling factor for each of the plurality of images based on the detected number of objects, resize one or more images among the plurality of images based on the determined scaling factor for each of the plurality of images, and control at least one of a layout and a display order of the plurality of images based on the resized images and control the display to display the plurality of images.

In accordance with an aspect of the present disclosure, a method for processing an image in an electronic device is provided. The method includes recognizing a plurality of images in the electronic device, detecting a number of objects included in each of the plurality of images, determining a scaling factor for each of the plurality of images based on the detected number of objects, resizing one or more images among the plurality of images based on the determined scaling factor for each of the plurality of images, and controlling at least one of a layout and a display order of the plurality of images based on the resized images and displaying the plurality of images on a screen of the electronic device.

According to the above-described various aspects of the present disclosure, when a plurality of images are displayed on a screen of an electronic device, the electronic device may resize and display an image with more objects to be larger than an image with fewer objects such that the user may be provided with the objects and content information included in the image more clearly.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
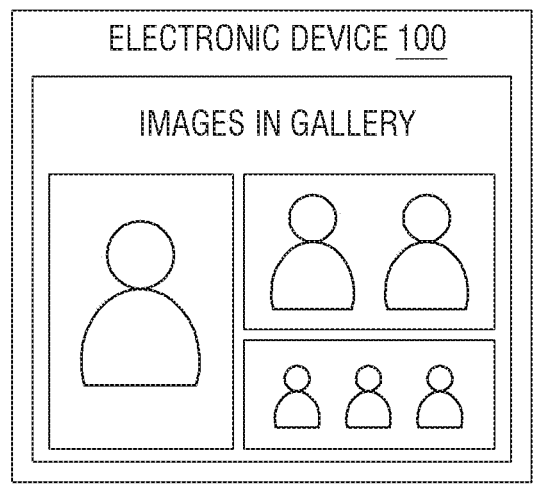
FIGS. 1A and 1B are diagrams for a comparison between the related art and the present disclosure when a plurality of images are displayed in an electronic device (system), according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments in the present disclosure may be modified variously, and the present disclosure may have several embodiments. In the following description, specific embodiments are provided with reference to accompanying drawings and detailed descriptions thereof. However, it should be noted that the embodiments do not limit the scope of the disclosure of the present disclosure to a specific embodiment form and include modifications, and/or equivalents and replacements included within the technical concept and technical scope disclosed herein. When it is determined that a detailed description on a related publicly-known technology may obscure the gist of the present disclosure unnecessarily, the detailed description will be omitted.

In the following description, a term including an ordinal, for example, 'first' or 'second,' may be used to distinguish elements, but the elements are not limited by the ordinal. The ordinal is used to only distinguish the same or similar elements.

A term in a singular form includes a plural form unless it is intentionally written that way. In the following description, a term, such as, 'include,' 'consist of,' or the like, refers to the disclosed features, numbers, operations, elements, parts, or combinations thereof and is not intended to exclude any possibilities of existence or addition of one or more other features, numbers, operations, elements, parts, or combinations thereof.

In the following description, a term 'module' or 'unit' refers to an element that performs at least one function or operation. The 'module' or 'unit' may be realized as hardware, software, or combinations thereof. A plurality of 'modules' or 'units' may be integrated into at least one module and realized as at least one processor (not shown), except for a case where respective 'modules' or 'units' need to be realized as discrete specific hardware.

A term 'system' in the following description may refer to a plurality of 'electronic devices' or one 'electronic device' according to an embodiment disclosed herein.

In addition, 'control elements' in the following description may be included in a 'user manipulation menu' according to an embodiment disclosed herein.

A term 'control unit' or 'controller' in the following description may refer to 'processor' according to an embodiment disclosed herein.

A term 'computing environment' in the following description may refer to 'electronic device' according to an embodiment disclosed herein.

A term 'relative scaling factor' in the following description may refer to 'relative scaling' or 'scaling factor.'

In addition, a term 'set' in the following description may refer to an image group consisting of a plurality of images, for example, a gallery application consisting of a plurality of images.

The embodiments herein achieve a method for managing display of a plurality of images in an electronic device. The method includes detecting the number of objects in each image and determining a relative scaling factor for each image based on the number of objects in each image. The relative scaling factor described herein may be determined by comparing the number of objects in each image among the plurality of images. Further, the method includes performing one or more actions on at least one image based on the relative scaling factor for each image.

In an embodiment, performing one or more actions may include resizing one or more images based on the relative scaling factor for each image and displaying the resized images on a screen of the electronic device.

In an embodiment, performing one or more actions may include selecting one or more images based on the relative scaling factor for each image and displaying the selected images on a screen of the electronic device.

In an embodiment, performing one or more actions may include cropping one or more images based on the relative scaling factor for each image and displaying the selected images on a screen of the electronic device. Unlike the systems and methods according to the related art, the images may be dynamically selected, resized, reordered, or restructured based on the objects in each image and a relative location of each image. The objects (may refer to data points) may include human faces, buildings, animals, objects, colors, or the like in an image. The relative scaling factor for each image may be determined by comparing the number of objects in each image among the plurality of images for resizing each image. Once the number of objects and the relative location of each image are determined in a group consisting of a plurality of images, the system (electronic device) determines a relative size of each image in a preview screen according to the number of objects. For example, an image with more number of objects may be resized to be larger than an image with less number of objects.

In an embodiment, the resized images are displayed in a tiled form according to the size of each image. In the following description, various operations involved in a method for displaying tiled-formed images are described. For each image in a set of images, content or information present in the each image is determined. The number of objects (for example, faces) are detected in each image. Further, salient regions, contrast, and gradient are detected in each image based on the objects in each image. An important metric is evaluated to determine proportional sizes according to a ratio for human perception. The images may be cropped or sub-sampled to resize the images so as to be fit into a given layout. Furthermore, the scaled images may be displayed in a tiled form.

In an embodiment, for a given set of images (a set consisting of a plurality of images), a slide show may be made. The slide show may be displayed to the user with a delay after each image. The delay time may be determined by a ratio according to the information or content of each image. Duration of the slide show is determined based on the evaluated important metric.

Further, the method may be used to resize a group of images of application icons, album covers, folders, video files icons, or the like based on the number of objects in each image and the relative location of each image in the plurality of images. For example, if the number of faces or objects in an application icon is more, the application icon may be resized and displayed relatively large as compared with the other icons. Similarly, a group of album covers may be resized based on the number of faces or objects in each album cover. For example, an album cover with more number of objects (for example, faces or information) may be resized to display the album cover relatively large as compared with the other album covers.

Further, the method according to the embodiment may be used to resize a plurality of images in applications, such as, image search, a social networking site (SNS) application, a multi-party video conference application, a gallery application, or the like. The images with more information may be resized to be larger than other images with relatively less information, and thus, the user may fully perceive the information on the images. Accordingly, the method according to the embodiment may enhance user experience.

Further, the embodiments herein achieve a method for managing display of an image in the electronic device. The method includes displaying a plurality of control elements on an image displayed on a screen of the electronic device and detecting the number of objects in the image. Further, the method may include dynamically shifting a position of at least one control element to a region of an image where the number of objects is detected as zero. That is, unlike the system according the related art (electronic device), when the image control elements are located at default locations in an image, the method may dynamically shift positions of the image control elements to a region of the image where the number of objects is zero. Accordingly, when the image control elements are shifted to the region where there is no object in the image, the image may be fully perceived. Further, the method according to the embodiment may be used to dynamically shift the control elements overlaid on an image in applications, such as, a view field of camera, image editing applications, image viewers, or the like.

Certain embodiments are described below in greater detail with reference to the accompanying drawings. The embodiments will be described in detail enough to be easily embodied by those skilled in the art. However, the present disclosure may be realized as any other various different forms and is not limited to the embodiments disclosed herein. In the accompanying drawing, a part unrelated to the description is omitted for a more clear description, and like drawing reference numerals are used for the like elements, even in different drawings, throughout the entire specification.

Figure 1B:
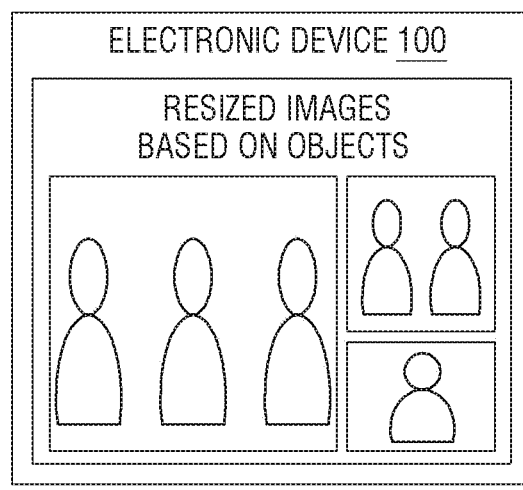

FIGS. 1A and 1B are diagrams for a comparison between the related art and the present disclosure when a plurality of images are displayed in an electronic device, according to various embodiments of the present disclosure.

An electronic device 100 may be all kinds of display devices that may display an image. For example, the electronic device 100 may include a mobile phone, a tablet personal computer (PC), a laptop computer, a television (TV), a smart phone, a smart watch, and so on. However, these are only examples, and the electronic device 100 is not limited thereto.

FIG. 1A is a diagram provided to describe an operation of displaying a plurality of images in the electronic device 100 in the related art. Referring to FIG. 1A, in an application for displaying a plurality of images, for example, a gallery application, the electronic device 100 may display a plurality of images on a screen. In the related art, the plurality of images displayed in the gallery application have the same size without considering information or content in each image. Meanwhile, FIG. 1B is a diagram provided to describe an operation of displaying a plurality of images in the electronic device 100 according to an embodiment disclosed herein. Referring to FIG. 1B, unlike the related art, the plurality of images may be resized based on the information or content in each image. In an embodiment, the information or content may include the number of objects in each image. As illustrated in FIG. 1B, the plurality of images may be resized based on the number of objects in each image.

In FIG. 1B, an image with three objects (for example, three content icons) may be resized to display the image in a larger size. Further, an image with two objects (for example, two content icons) may be resized to display the image in a slightly smaller size as compared to the image with three objects. Furthermore, an image with one object (for example, one content icon) may be resized to display the image even smaller than the image with two objects. That is, each image of the plurality of images may be resized based on the number of objects in each image. It should be noted that the layouts of the plurality images remain the same in the FIGS. 1A and 1B.

In an embodiment, in order to resize each image, a relative scaling factor for each image may be determined. The relative scaling factor may be determined by comparing the number of objects in each image among the plurality of images. After determining the relative scaling factor for each image, the plurality of images may be resized based on the relative scaling factor for each image.

The images shown in the FIGS. 1A and 1B are only examples for illustrative purpose and do not limit the scope of the present disclosure. In addition, any image may be resized based on the number of objects present in the image. For example, images of application icons, album covers, folders, video files icons, or the like may be resized based on relative sizes, the number of objects, and various information contents of the images.

Figure 2:
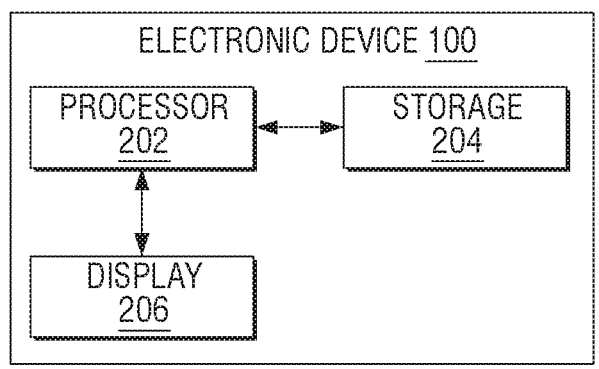
FIG. 2 is a simple block diagram illustrating an electronic device for managing display of a plurality of images, according to an embodiment of the present disclosure.

FIG. 2 is a simple diagram illustrating an electronic device for managing display of a plurality of images, according to an embodiment of the present disclosure. In an embodiment, the electronic device 100 includes a processor 202, a storage unit 204, and a display 206.

The processor 202 may perform one or more actions for managing display of the plurality of images in the electronic device 100. In an embodiment, the processor 202 may detect the number of objects in each image. The objects (may also be referred as data points) described herein may include human faces, buildings, animals, objects, colors, entropy of image, or the like. In an embodiment, an object in an image may have at least one of three distinctive characteristics, such as, a well-defined closed boundary in a space, a different appearance from a surroundings, and being unique and salient within the image, and many object may have several of these characteristics at the same time. In an embodiment, "Alexe, Bogdan, Thomas Deselaers, and Vittorio Ferrari. "What is an object?" computer vision and pattern recognition (CVPR), 2010 IEEE Conference on. IEEE, 2010" may be referred to detect an object in an image. Further, any other method known or yet to be known in the art may be used to detect the objects in the image.

When an image is stored in the storage unit 204, the number of objects in the image may be determined before the image is stored in the storage unit 204, and the processor 202 may control the storage unit 204 to store the determined number of objects of the image in the storage unit 204 along with the image.

In an embodiment, when the electronic device 100 stores images, the number of objects in each image may be computed before the images are stored in the electronic device 100.

When an image is loaded in the electronic device 100 in real time, the processor 202 may determine the number of objects in the image while the image is loaded and control the storage unit 204 to stores the determined number of objects in the image in the storage unit 204 along with information on the images.

In an embodiment, when images are dynamically loaded (for example, in a web page), the number of objects in each image may be computed while the web page is loaded.

The processor 202 may detect the objects in each image by using at least one of color contrast, edge density, Bayesian integration, and Superficial Straddling. The above-described methods are only an examples and do not limit the scope of the present disclosure. The processor 202 may detect the objects in each image by using one or more methods.

The processor 202 may determine a relative scaling factor for each image based on the number of objects in each image. In addition, the processor 202 may perform one or more actions based on the relative scaling factor for each image.

That is, the processor 202 may determine the scaling factor for each image by comparing the number of objects in each image among the plurality of images.

According to an embodiment, performing one or more actions may include resizing one or more images based on the relative scaling factor for each image and displaying the resized images on a screen of the electronic device 100.

The processor 202 may control at least one of a layout and a display order of the plurality of images based on the resized images and control the display 206 to display the plurality of images.

In addition, the processor 202 may resize an image with more objects among the plurality of images to be relatively large.

The processor 202 may control the display 206 to selectively display images where the objects occupy a high ratio among the resized images of the plurality of images.

That is, the processor 202 may control the display 206 to select and display images that clearly show the objects from among the resized images of the plurality of images. For example, when two images among six images include three persons respectively, three persons in one of the two images may be identified clearly, and three persons in the other one of the two images may not be identified clearly. In this case, the processor 202 may control the display 206 to select and display an image where an object (for example, a person) is clearly identified. The processor 202 may determine an identification degree of the object based on a ratio where the object occupies in an image region. However, this is only an example and does not limit the scope of the present disclosure. That is, processor 202 may determine the clearness of the objects in images with the same number of objects by diverse methods.

According to an embodiment, the processor 202 may crop one or more images based on the relative scaling factor for each image and control the display 206 to display the selected images on a screen of the electronic device 100.

The processor 202 may determine a region of interest (ROI) for each of the plurality of images, crop a region where the objects are included out of at least one image among the plurality of images based on the determined ROI for each of the plurality of images, and control the display 206 to display an image of the cropped region.

For example, the ROI may be a salient region in each image. The salient region detection method is used to detect a salient region in each image. The processor 202 may resize the cropped images in such a way that the salient region is made more prominent and bigger.

Unlike the systems according to the related art (electronic devices) and methods, the images may be dynamically selected, resized, reordered, or restructured based on the objects in each image and the relative location of each image. The scaling factor for each image is determined by comparing the number of objects in each image among the plurality of images for resizing of each image.

Once the number of objects and the relative location of the objects are determined in a group of images, the processor 202 may determine a relative size of an image in a preview screen based on the number of objects. For example, an image with more number of objects may be resized to be larger than an image with less number of objects.

The processor 202 may divide a region where the plurality of images are displayed into n number of designated tiled forms and control the display 206 to re-render and display the image resized according to the number of objects in the n number of tiled forms.

In response to the objects being included in an image, and a caption for describing the image being displayed separately from the image, the processor 202 may control the display 206 to overlay the caption on the image and resize and display the image.

In response to an image being selected from among the plurality of images, and a user manipulation menu being overlaid and displayed on the selected image, the processor 202 may control the display 206 to shift and display the user manipulation menu from a region of the selected image to a region where no object is detected.

For example, the user manipulation menu may be icons, menus, or the like which have an editing function and are overlaid on an image. In addition, the user manipulation menu may be icons, menus, or the like which are overlaid on a photographing-standby screen.

In response to the user manipulation menu being shifted to the region where no object is detected, the processor 202 may control the display 206 to increase or decrease a size of the user manipulation menu so as to fit a size of the region where no object is detected.

Further, in an embodiment, the processor 202 may detect the number of objects in the image and dynamically shift a position of at least one control element to a region of the image where the number of objects is detected as zero. Unlike the systems according to the related art (electronic device 100), when the image control elements are spaced at the default locations in the image, the method according to the embodiment disclosed herein may dynamically shift the position of the image control elements to the region of the image where the number of objects is not detected in the image (the region where the number of objects is detected as zero). When the image control elements are displayed in the region of the image where there are no objects, the image may be fully perceived by the user. Further, the method according to the embodiment disclosed herein may be used to dynamically shift the control elements in applications, such as, view field of camera, image editing applications, image viewers, or the like. Further, various units of the processor 202 for managing the display of images are described below with reference to the FIG. 3.

The storage unit 204 may store the plurality of images. The storage unit 204 may include one or more computer-readable storage mediums. The storage unit 204 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In some embodiments, the storage unit 204 may be a non-transitory storage medium. The term 'non-transitory' may indicate a storage medium that is not embodied in a carrier wave or a propagated signal. However, the term 'non-transitory' should not be interpreted that the storage unit 204 is non-movable. In some embodiments, the storage unit 204 may be configured to store larger amounts of information than the memory. In certain embodiments, the non-transitory storage medium may store greater amount of data than the memory. In certain embodiments, the non-transitory storage medium may store data that may change over time (for example, random access memory (RAM) or cache).

The display 206 may display one or more resized images on a screen of the electronic device 100.

Referring to FIG. 2, shows a limited embodiment of the electronic device 100 but, it is to be understood that the embodiment of FIG. 2 is only an example, and other embodiments are not limited thereto. The labels or names of the units in the block diagram are used only for illustrative purpose and do not limit the scope of the present disclosure. Further, the electronic device 100 may include any number of units or sub-units communicating with the other components. Likewise, the functionalities of each unit may be realized as a single unit or as discrete units in a different manner described herein without departing from the scope of the present disclosure.

Figure 3:
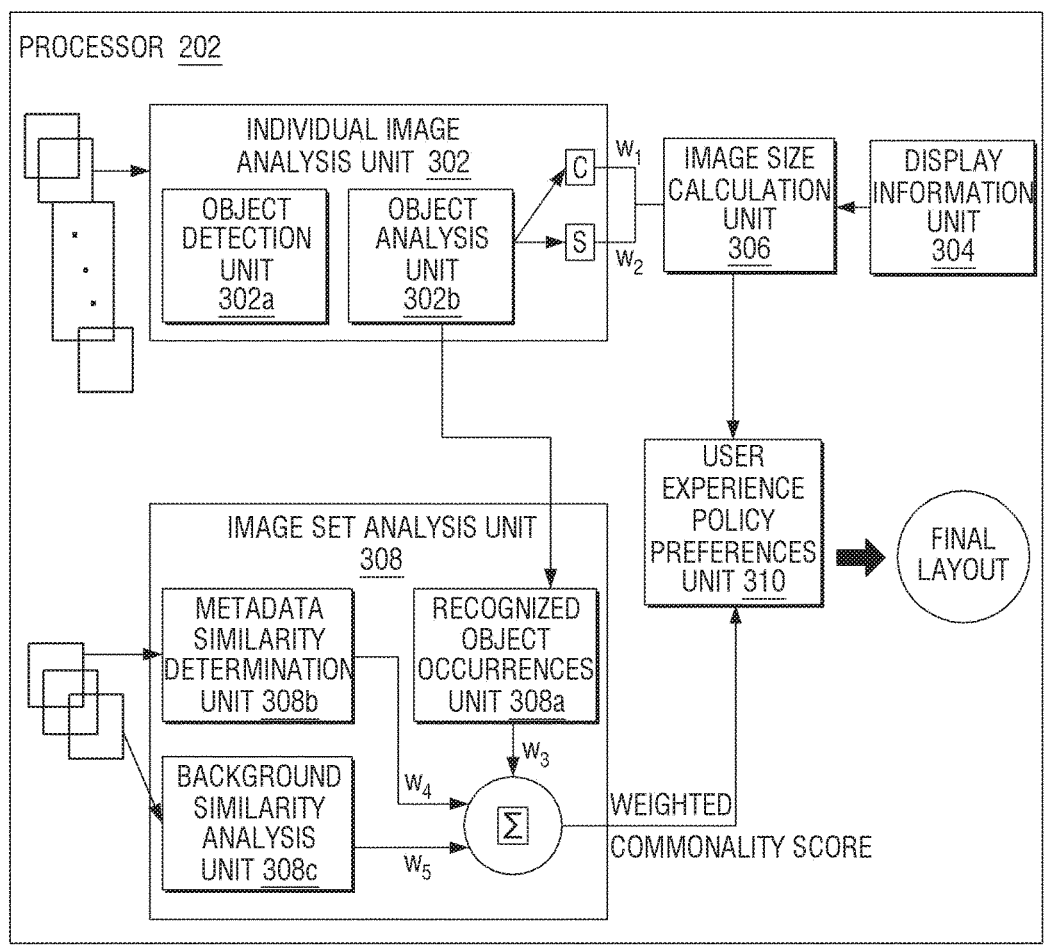
FIG. 3 is a detailed block diagram illustrating a processor according to an embodiment of the present disclosure.

FIG. 3 is a detailed block diagram illustrating a processor for generating a layout of an image, according to an embodiment of the present disclosure.

Referring to FIG. 3, the processor 202 may include the units, such as, an individual image analysis unit 302, a display information unit 304, an image size calculation unit 306, and an image set analysis unit 308.

In an embodiment, the individual image analysis unit 302 includes an object detection unit 302a and an object analysis unit 302b. The object detection unit 302a may be configured to detect one or more objects in an image. The object detection unit 302a may utilize one or more object recognition techniques for detecting one or more objects. The object detection unit 302a may detect coordinates of the objects.

In an embodiment, the object analysis unit 302b may be configured to receive the coordinates of the objects from the object detection unit 302a. Further, the object analysis unit 302b may be configured to perform analysis, such as, counting the number of objects (denoted as C), sizes of the objects (denoted as S), and various features of the object (such as identification of faces in the objects). The object analysis unit 302b may be configured to process images to generate three outputs which include the size of the objects, count of the objects, and a feature vector for each object, respectively. In an embodiment, weights $w_1$ and $w_2$ may be assigned to the count of objects and the size of the objects, respectively.

In an embodiment, the display information unit 304 may be configured to provide display parameters, such as, a screen size or the like. The display information unit 304 may provide the display parameters as an input to the image size calculation unit 306.

In an embodiment, the image size calculation unit 306 may be configured to calculate the image size using the weights $w_1$ and $w_2$. The image size calculation unit 306 may be configured to calculate a final image size based on the C and S values provided by the object analysis unit 302b (the weights provided) along with the input provided by the display information unit 304.

Further, in an embodiment, the image set analysis unit 308 includes a recognized object occurrences unit 308a, a metadata similarity determination unit 308b, and a background similarity analysis unit 308c. The recognized object occurrences unit 308a may be configured to receive an input from the object analysis unit 302b. Further, the recognized object occurrences unit 308a may be configured to generate the feature vector of the objects in the image.

In an embodiment, the metadata similarity determination unit 308b may be configured to extract metadata information (such as location and time) from the images when the images are captured. The metadata information may be used to determine the similarity between the images. In an embodiment, the metadata information may be a factor while an image to be displayed in the final layout is selected.

In an embodiment, the background similarity analysis unit 308c may be configured to analyze the backgrounds of the images from a set and find the similarity between the backgrounds. For example, the backgrounds of two images may both be 'forest' or 'garden.'

The image set analysis unit 308 may calculate a value such as a 'weighted commonality score' by adding weighted outputs from each of the recognized object occurrences unit 308a, the metadata similarity determination unit 308b, and the background similarity analysis unit 308c. The weighted commonality score represents a degree of similarity between one image and the other images in the same (image) set, in folders, or in album images.

In an embodiment, a user experience (UX) policy preferences unit 310 may be configured to apply the UX policy for determining the display of the images. Based on the UX policy, the final layout of the images may be decided and then displayed.

FIG. 3 shows a limited overview of the processor 202, but it is to be understood that other embodiments are not limited thereto. The labels or names of the units in FIG. 3 are used only for the illustrative purpose and do not limit the scope of the present disclosure. Further, the processor 202 may include any number of units or sub-units communicating with the other components. Likewise, the functionalities of each unit may be realized as a single unit or as discrete units in a different manner described herein without departing from the scope of the present disclosure.

Figure 4:
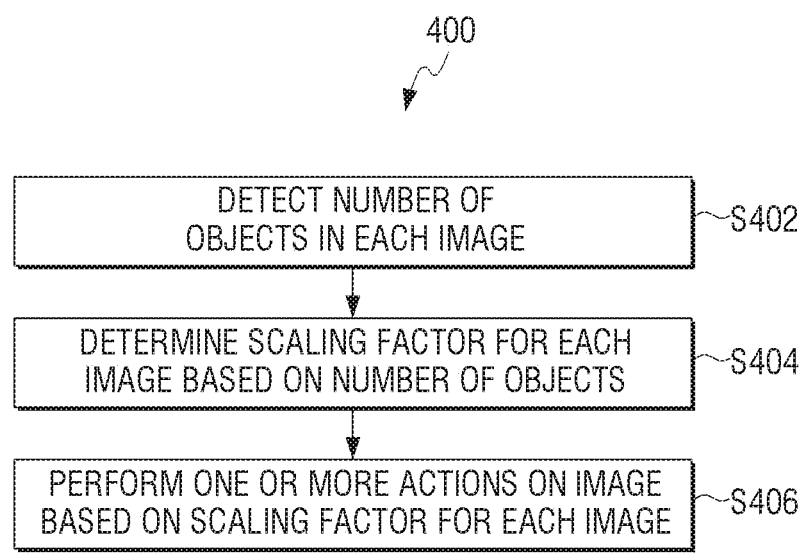
FIG. 4 is a flowchart provided to describe a method for managing display of a plurality of images in an electronic device, according to an embodiment of the present disclosure.

FIG. 4 is a flowchart provided to describe a method for managing display of a plurality of images in an electronic device, according to an embodiment of the present disclosure.

Referring to FIG. 4, operation S402, a method 400 includes detecting the number of objects in each image. Accordingly, the processor 202 may detect the number of objects in each image. In operation S404, the method 400 includes determining the relative scaling factor for each image based on the number of objects. Accordingly, the processor 202 may determine the relative scaling factor for each image based on the number of objects. In operation S406, the method 400 includes performing one or more actions on the images based on the relative scaling factor for each image. Accordingly, the processor 202 may perform the actions on the images based on the relative scaling factor for each image.

The various actions, acts, blocks, operations, or the like in the method 400 may be performed in the presented order, in a different order, or simultaneously. Further, in some embodiments, some of the actions, acts, blocks, operations, or the like may be omitted, added, modified, skipped, or the like without departing from the scope of the present disclosure.

Figure 5:
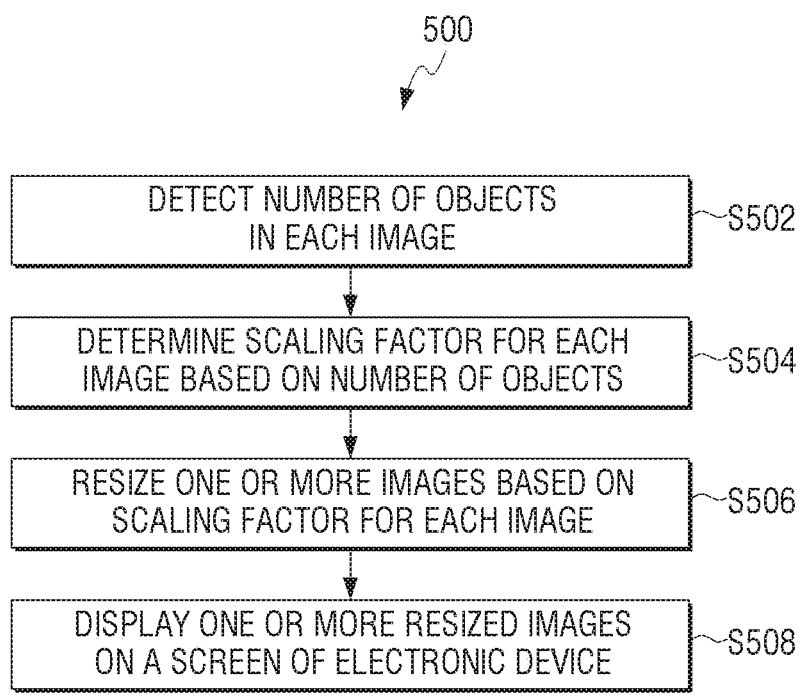
FIG. 5 is a flowchart provided to describe a method for resizing one or more images, according to an embodiment of the present disclosure.

FIG. 5 is a flowchart provided to describe a method for resizing one or more images, according to an embodiment of the present disclosure.

Referring to FIG. 5, operation S502, a method 500 includes detecting the objects in each image. Accordingly, the processor 202 may detect the number of objects in each image. In operation S504, the method 500 includes determining the relative scaling factor for each image based on the number of objects. Accordingly, the processor 202 may determine the relative scaling factor for each image based on the number of objects.

In operation S506, the method 500 includes resizing one or more images based on the relative scaling factor for each image. Accordingly, the processor 202 may resize one or more images based on the relative scaling factor for each image. In operation S508, the method 500 includes displaying one or more resized images on a screen of the electronic device 100. Accordingly, the processor 202 may control the display 206 to display the one or more resized images on the screen of the electronic device 100.

The various actions, acts, blocks, operations, or the like in the method 500 may be performed in the presented order, in a different order, or simultaneously. Further, in some embodiments, some of the actions, acts, blocks, operations, or the like may be omitted, added, modified, skipped, or the like without departing from the scope of the present disclosure.

FIGS. 6A 6B, 7A, 7B, and 8A to 8H are diagrams for a comparison between the related art and the present disclosure when a plurality of images are displayed in an electronic device, according to various embodiments of the present disclosure.

Figure 6A:
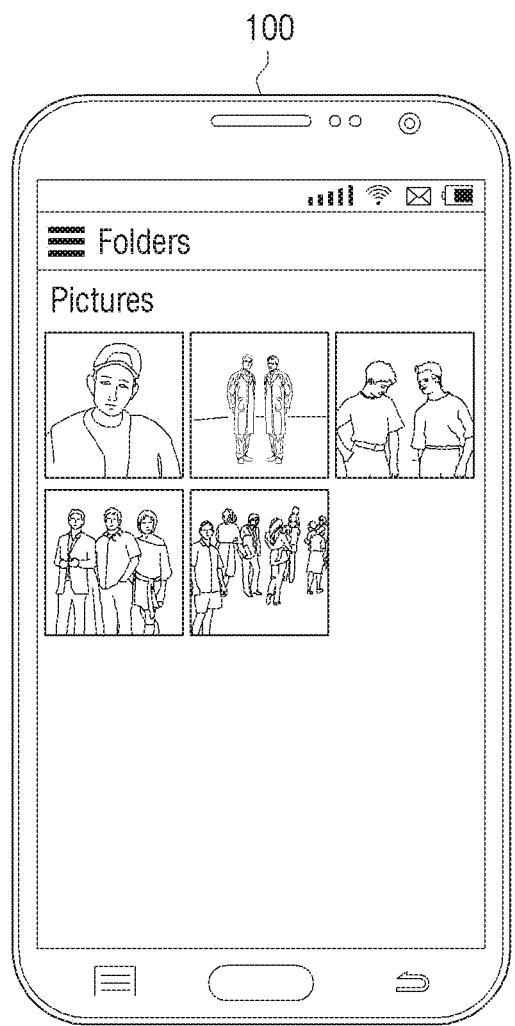
FIGS. 6A, 6B, 7A, 7B, and 8A to 8H are diagrams for a comparison between the related art and the present disclosure when a plurality of images are displayed in an electronic device, according to various embodiments of the present disclosure.
Figure 6B:
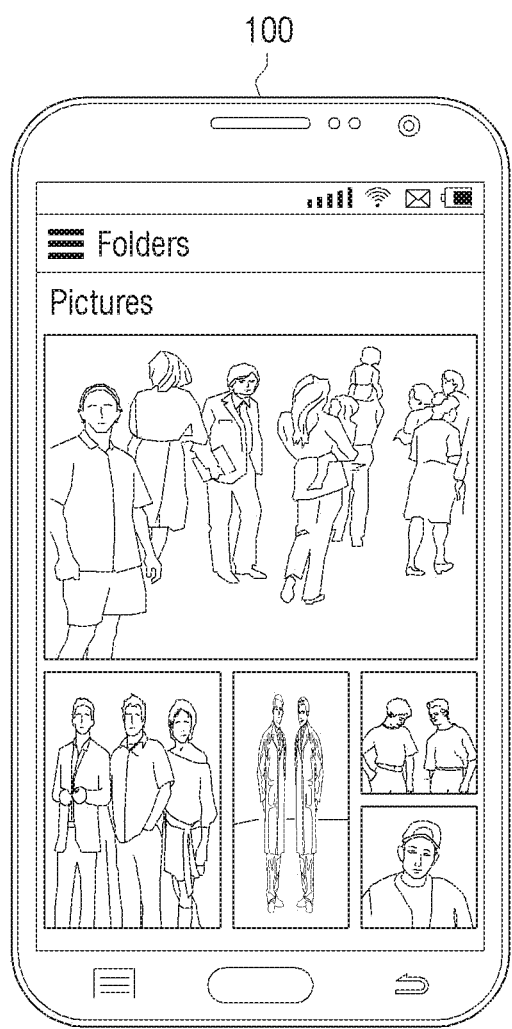

FIGS. 6A and 6B are diagrams for a comparison between the related art and the present disclosure when a plurality of images are displayed in a gallery application of an electronic device, according to various embodiments of the present disclosure.

Referring to FIG. 6A, is a diagram provided to describe an example where a plurality of images are displayed in a gallery application of the electronic device 100, in the related art. Referring to FIG. 6A, it may be inferred that the plurality of images are displayed without considering the number of objects (for example, number of persons) in each image. FIG. 6B is a diagram provided to describe an example where the plurality of images are resized based on the number of persons in each image, unlike the related art.

Referring to FIG. 6B, it may be inferred that the image with more number of persons is resized to display the image in a larger size. For example, an image with the greatest number of persons may be resized and displayed in the largest size, and an image with three persons may be resized and displayed in a larger size as compared to images with two persons. An image with one person may be resized and displayed in the smallest size. In addition, in the images with two persons, an image including whole bodies of the persons may be resized and displayed to be larger than an image including half bodies of the persons. FIG. 6B illustrates an example where the sizes of the images are changed depending upon the number of objects in each image, and the layout and the display order of the images are reordered according to the changed size of the images, unlike FIG. 6A. However, this is only an example for the illustrative purpose and does not limit the scope of the present disclosure. For example, FIG. 6B illustrates an example where the layouts of the plurality of images remain the same as in FIG. 6A, and each image is resized and displayed based on the number of objects in each image.

When the images are resized as shown in FIG. 6B, the user is able to identify individual persons more clearly in a group image (image with several persons). For example, in FIG. 6A, it may be difficult to identify the individual persons in the image with the greatest number of persons. However, referring to FIG. 6B, the image with the greatest number of persons is resized and displayed to be in the largest size such that the user is able to fully identify the individual persons in the image. That is, according to an embodiment, the size of each of the plurality of images may be changed based on the number of objects in each image. Accordingly, the electronic device 100 may display the plurality of images such that the information or content of each image is perceived easily by the user, thereby enhancing the UX.

Figure 7A:
Figure 7B:

FIGS. 7A and 7B are diagrams for a comparison between the related art and the present disclosure when a plurality of images are displayed in a collage, according to various embodiments of the present disclosure.

Referring to FIG. 7A, illustrates an example where a plurality of images are provided in a collage, in the related art. Referring to FIG. 7A, it may be inferred that the plurality of images are displayed without considering the number of objects (i.e., number of persons) in each image. FIG. 7B illustrates an example where the sizes of the plurality of images are changed based on the number of persons in each image unlike the related systems. That is, the images in the collage are resized based on the number of objects in each image.

Referring to FIG. 7B, the image with the greatest number of persons is displayed in the largest size. In addition, the image with three persons is resized and displayed to be smaller than the image with the greatest number of persons. The images with one person are resized and displayed to be smaller than the images with two persons. That is, as illustrated in FIG. 7B, each image in the collage is resized based on the number of persons in each image.

In addition, in the related art, when the collage is displayed in the album application, the electronic device 100 displays a part of region of images without displaying the entire image of the images in a collage preview image. However, according to an embodiment, the electronic device 100 may display the images such that the entire information in the image (for example, content information including faces or the like) is displayed in the collage preview image by resizing the images based on the number of objects in each image. In FIGS. 7A and 7B, the layouts of the plurality of images are illustrated the same. However, this is only an example for the illustrative purpose and does not limit the scope of the present disclosure.

Figure 8A:
Figure 8B:

FIGS. 8A and 8B are diagrams for a comparison between the related art and the present disclosure when a plurality of images are displayed in a multi-party video conference, according to various embodiments of the present disclosure.

Referring to FIG. 8A, illustrates an example where persons in the multi-party video conference are displayed, in the related art. Referring to FIG. 8A, it may be inferred that the plurality of images are displayed without considering the number of objects (i.e., number of persons) in each image of the multi-party video conference. FIG. 8B illustrates an example where the plurality of images are resized based on the number of persons in each image of the multi-party video conference, unlike the related art. FIG. 8B illustrates an example where each image is resized based on the number of participants of the multi-party video conference.

Figure 8C:
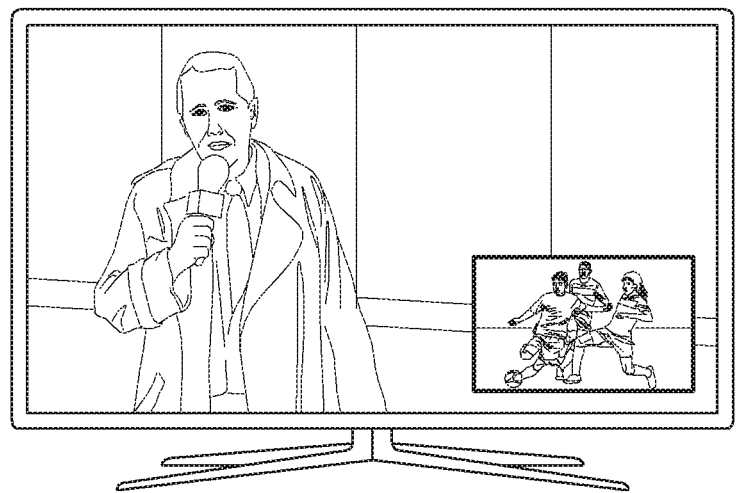
Figure 8D:
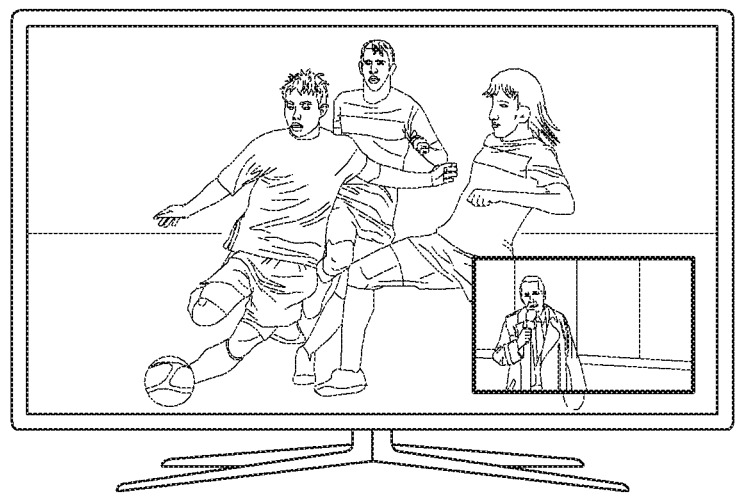

FIGS. 8C and 8D are diagrams for a comparison between the related art and the present disclosure when a plurality of images are displayed in a television simultaneously showing two channels, according to various embodiments of the present disclosure.

Referring to FIG. 8C, illustrates an example where the television shows two channels simultaneously, and an image is displayed in a window corresponding to each channel at any given instant of time. FIG. 8D illustrates an example where a size of a window of each channel is adjusted based on the number of objects in each window, unlike the related art. Referring to FIG. 8C, a window with three players is resized to be larger than a window with one news reader. That is, when the television show two channels simultaneously, the sizes of the windows may be adjusted dynamically based on the number of objects in each window.

Figure 8E:
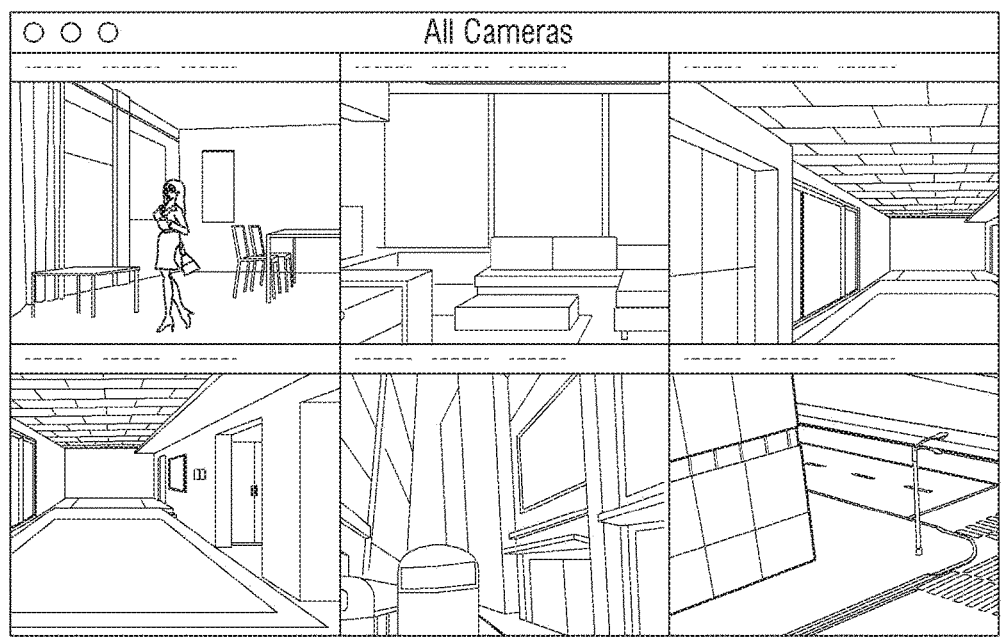
Figure 8F:
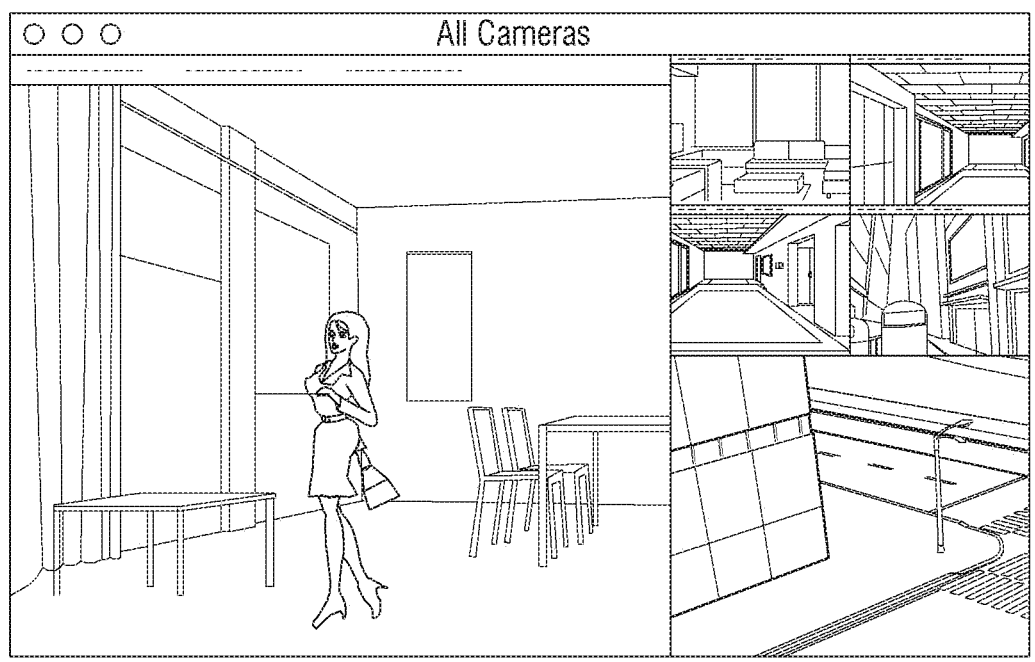

FIGS. 8E and 8F are diagrams for another comparison between the related art and the present disclosure when a plurality of images are displayed in a video surveillance, according to various embodiments of the present disclosure.

Referring to FIG. 8E, illustrates an example where a plurality of images are displayed in a video surveillance, in the related art. In the related art, the number of objects in each image is not considered while the plurality of images are displayed. FIG. 8F illustrates an example where each image among a plurality of images is resized based on the number of objects in each image, unlike the related art. Referring to FIG. 8F, video feeds in the video surveillance are resized based on the number of objects.

Figure 8G:
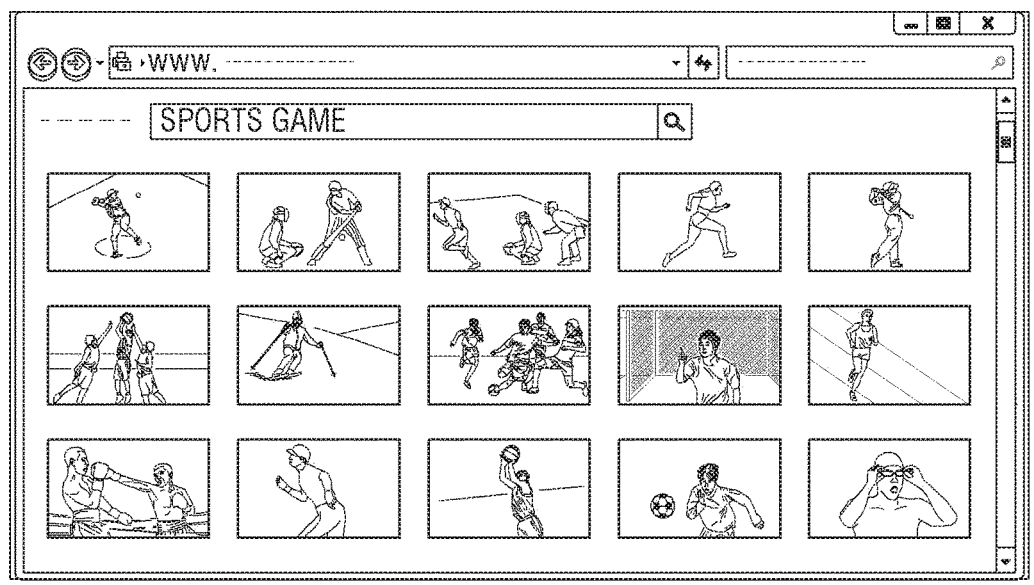
Figure 8H:
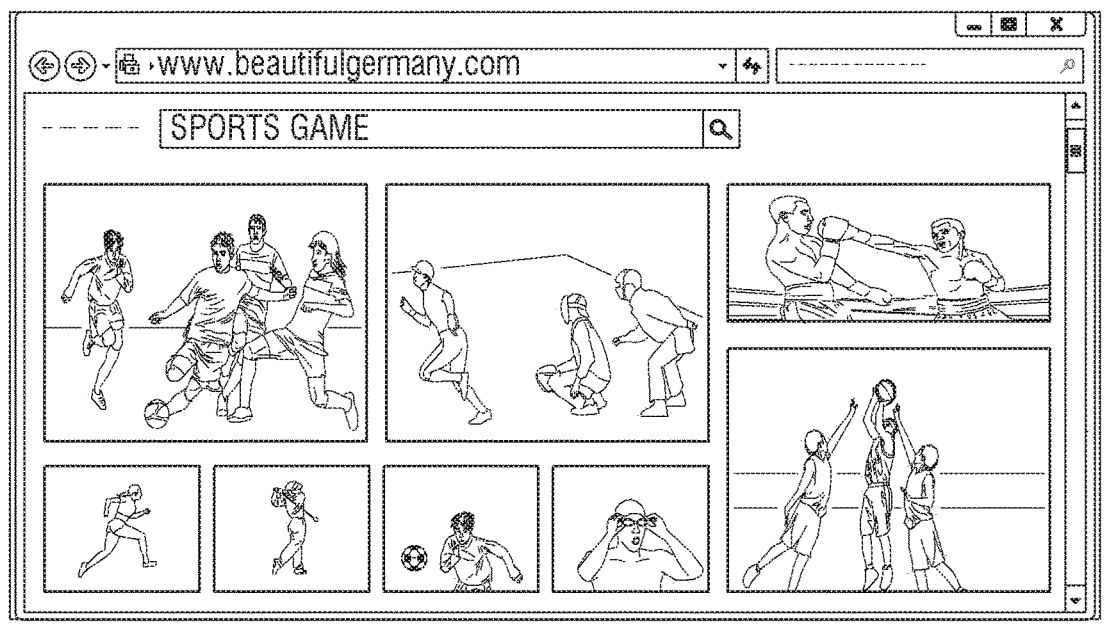

FIGS. 8G and 8H are diagrams for a comparison between the related art and the present disclosure when images searched in a web page are displayed in the same size, according to various embodiments of the present disclosure.

Referring to FIG. 8G, illustrates an example where images searched in a web page are displayed in the same size, in the related art. FIG. 8G illustrates an example where the images searched on the web page are resized and displayed based on the number of objects, according to an embodiment, unlike the related art. When the images are loaded from the web page, the number of objects in each image may be calculated while the images are loaded. In addition, each image may be resized dynamically based on the number of objects in each image, and the resized images may be displayed in the web page.

Figure 8I:
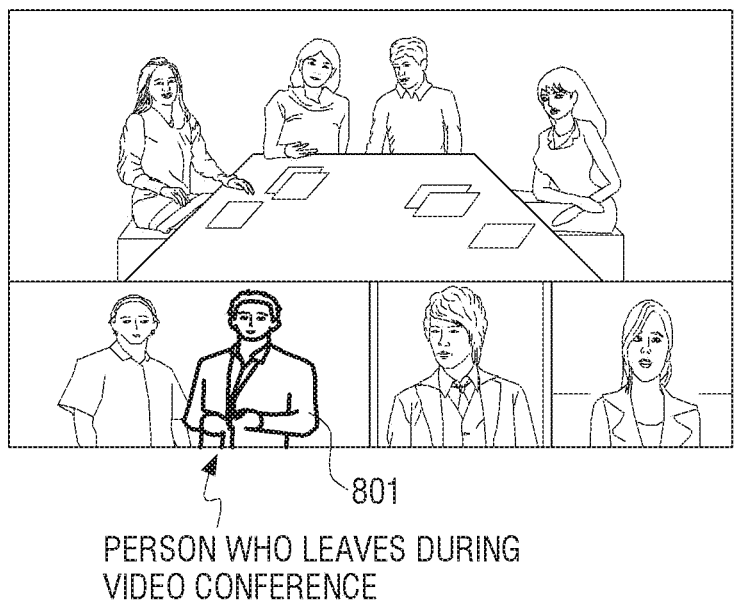
FIGS. 8I and 8J are diagrams provided to describe a scenario of displaying a plurality of images when a person leaves a multi-party video conference, according to various embodiments of the present disclosure.
Figure 8J:
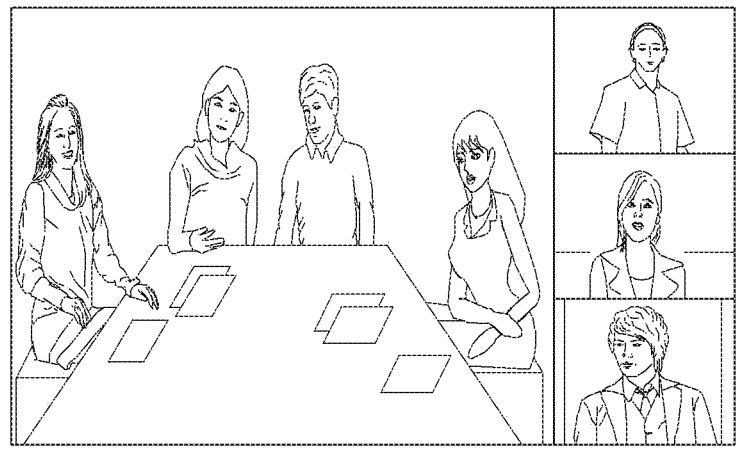

FIGS. 8I and 8J illustrate a scenario for displaying a plurality of images when a person leaves a multi-party video conference, according to various embodiments of the present disclosure.

Referring to FIG. 8I, shows an ongoing multi party video conference. During the multi-party video conference, a person 801 may leave the multi-party video conference. When the person 801 leaves the multi-party video conference, the images of the multi-party video conference may be resized based on the number of remaining persons.

Referring to FIG. 8J, shows images after the person 801 leaves the multi-party video conference. When the person 801 leaves the multi-party video conference, the images of FIG. 8I may be resized as illustrated in FIG. 8J. When one or more persons join the video conference during the video conference, the images of the multi-party video conference may be resized and displayed based on the number of objects in each image.

The processor 202 may divide a region where a plurality of images are displayed into n number of designated tiled forms. In addition, the processor 202 may control the display 206 to re-render and display the images resized based on the number of objects in each image in the n number of tiled forms.

Figure 9:
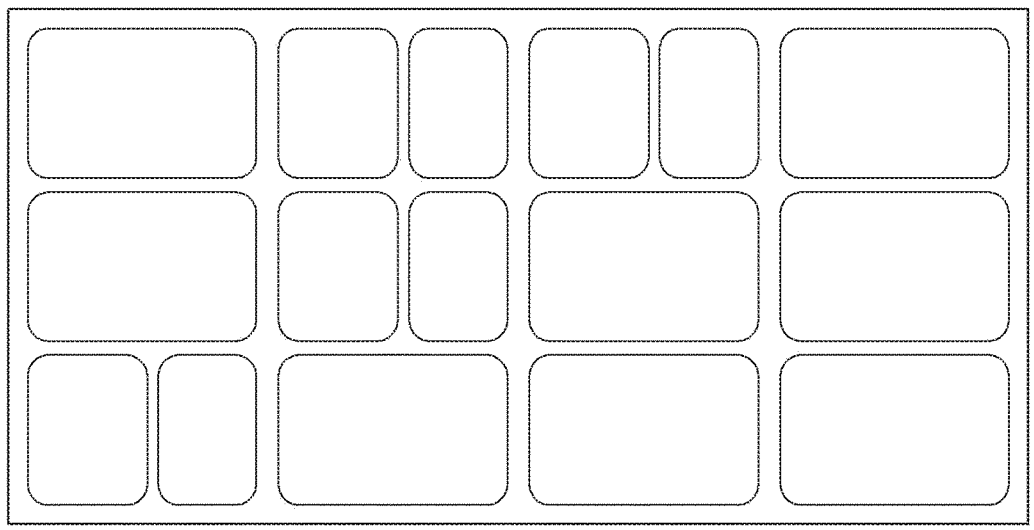
FIG. 9 is a diagram illustrating a plurality of tiles, according to an embodiment of the present disclosure.

FIG. 9 is a diagram illustrating a plurality of tiles, according to an embodiment of the present disclosure.

Referring to FIG. 9, each icon is a tile. Each tile may be resized based on the number of objects in each tile. Application icons and folder icons may be also images which may have objects, such as, faces of humans. The application icons and folders may be resized by counting the number of objects. The application icons and folders may be resized in proportion to the number of objects. For example, an image size of an icon with more objects may be displayed to be relatively large as compared with an image size of the icons with less objects.

Figure 10A:
FIGS. 10A and 10B are diagrams for a comparison between the related art and the present disclosure when a plurality of images of album covers are displayed in a music application, according to various embodiments of the present disclosure.
Figure 10B:
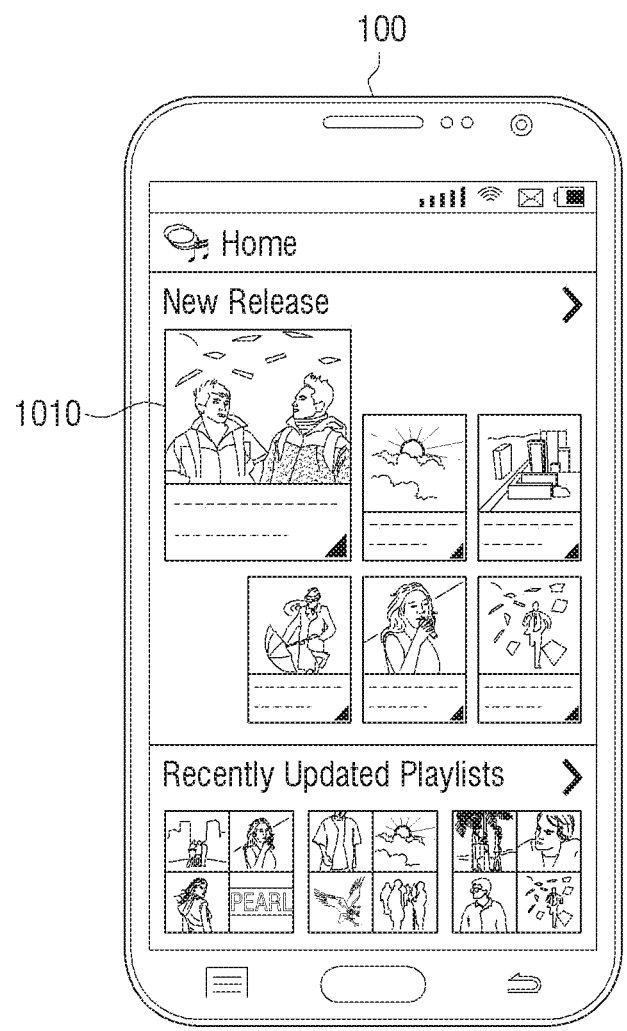

FIGS. 10A and 10B are diagrams for a comparison between the related art and the present disclosure when a plurality of images of album covers are displayed in a music application, according to various embodiments of the present disclosure.

Referring to FIG. 10A, illustrates an example where images of the album covers are displayed, in the related art. Referring to FIG. 10A, the images of the album covers are displayed in the same size without considering the number objects in each image of the album covers.

Referring to FIG. 10B, illustrates an example where the images of the album covers are resized and displayed, unlike the related art. Referring to FIG. 10B, an album icon 1010 with the greatest number of objects is resized to be the largest.

Figure 11:
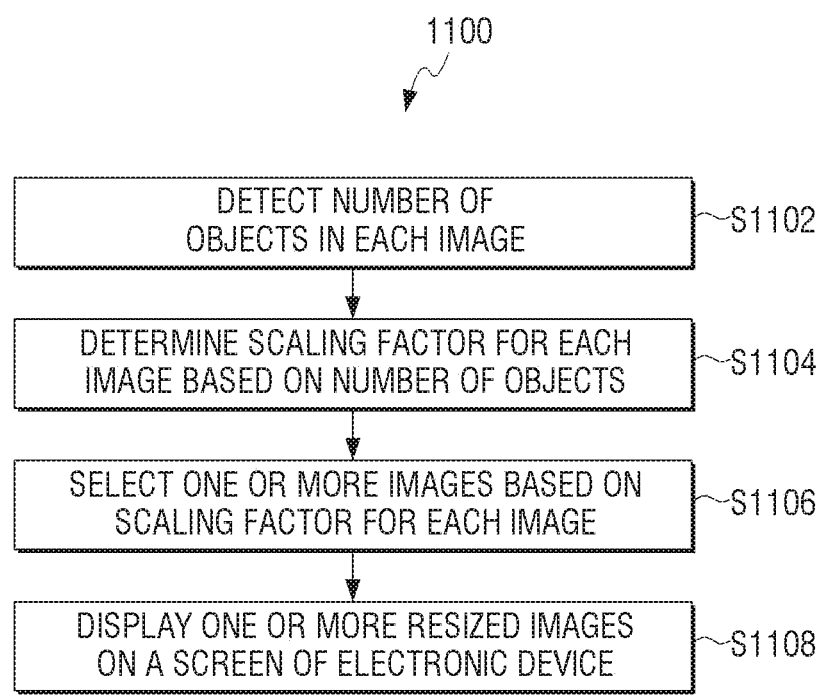
FIG. 11 is a sequence diagram provided to describe a method for selecting one or more images, according to an embodiment of the present disclosure.

FIG. 11 is a sequence diagram provided to describe a method for selecting one or more images, according to an embodiment of the present disclosure.

Referring to FIG. 11, operation S1102, a method 1100 includes detecting the number of objects in each image. Accordingly, the processor 202 may detect the number of objects in each image. In operation S1104, the method 1100 includes determining the relative scaling factor for each image based on the number of objects. Accordingly, the processor 202 may determine the relative scaling factor for each image based on the number of objects.

In operation S1106, the method 1100 includes selecting one or more images based on the relative scaling factor for each image. Accordingly, the processor 202 may select one or more images based on the relative scaling factor for each image. In operation S1108, the method 1100 includes displaying one or more resized images on the screen of the electronic device 100. Accordingly, the processor 202 may display the one or more resized images on the screen of the electronic device 100.

The various actions, acts, blocks, operations, or the like in the method 1100 may be performed in the presented order, in a different order, or simultaneously. Further, in some embodiments, some of the actions, acts, blocks, operations, or the like may be omitted, added, modified, skipped, or the like without departing from the scope of the present disclosure.

Figure 12A:
FIGS. 12A and 12B are diagrams for a comparison between the related art and the present disclosure when a plurality of images are displayed in a social networking site (SNS), according to various embodiments of the present disclosure.
Figure 12B:
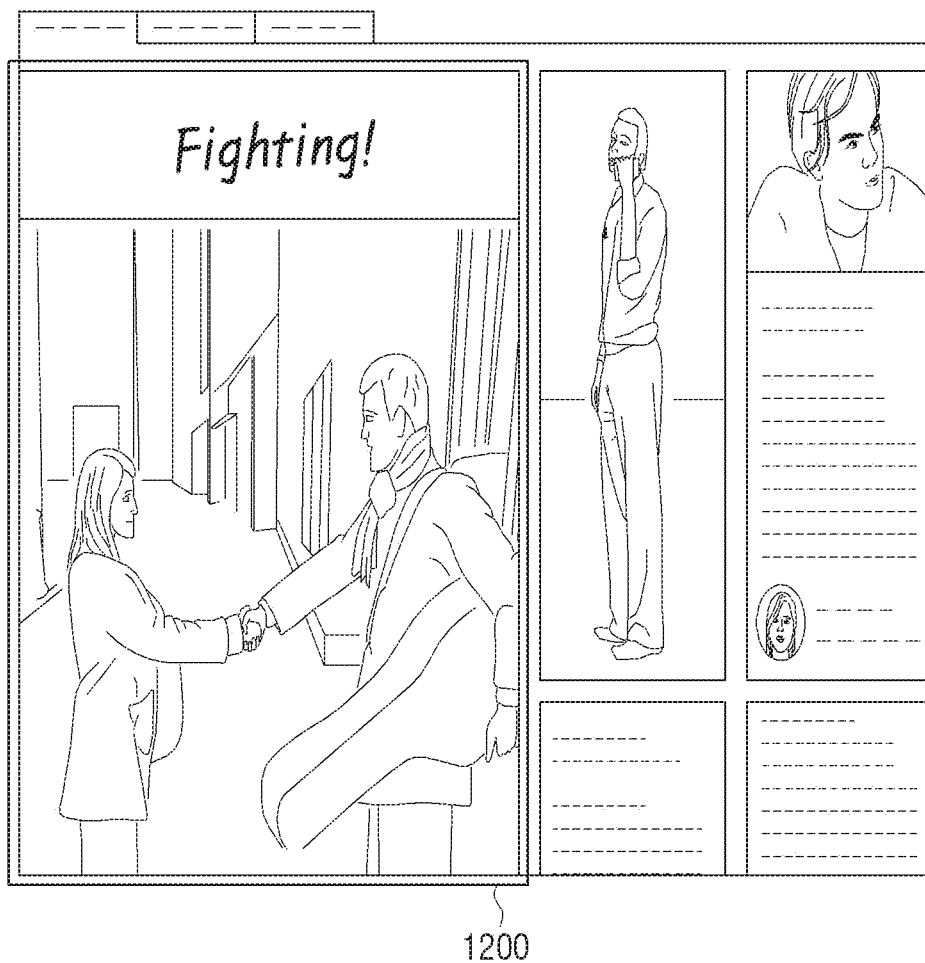

FIGS. 12A and 12B are diagrams for a comparison between the related art and the present disclosure when a plurality of images are displayed in a SNS, according to various embodiments of the present disclosure.

Referring to FIG. 12A, illustrates an example where the images 1200 in the SNS are displayed, in the systems according to the related art. Referring to FIG. 12A, it may be inferred that the plurality of images are displayed without considering the number of objects (i.e., number of persons) in each image or a user has to manually select an image to be displayed. FIG. 12B illustrates an example where the plurality of images 1200 in the SNS are dynamically selected based on the number of persons in each image, unlike the related art. Referring to FIG. 12B, in an image feed in the SNS, the images may be dynamically selected and resized based on the number of objects.

Figure 13:
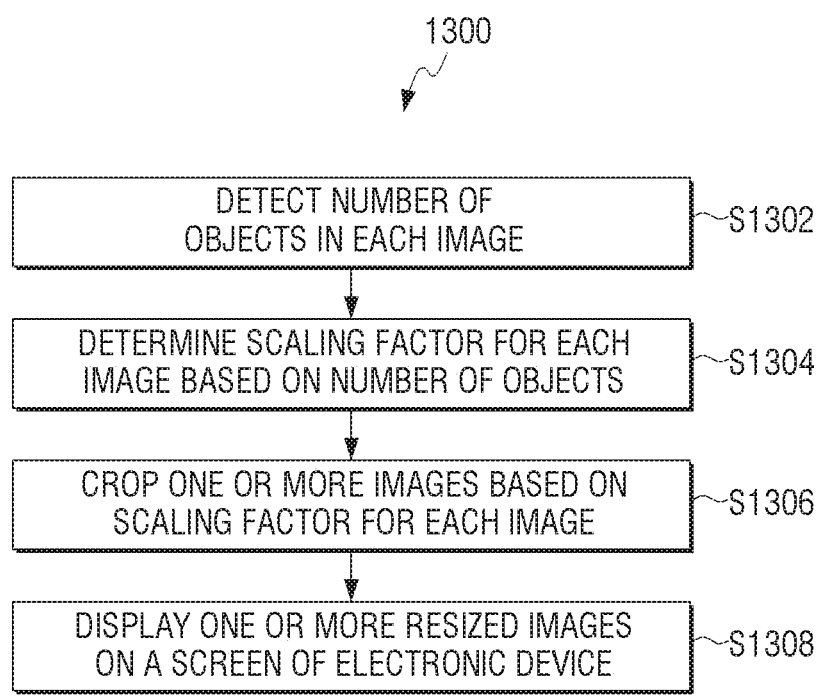
FIG. 13 is a flowchart provided to describe a method for cropping one or more images, according to an embodiment of the present disclosure.

FIG. 13 is a flowchart provided to describe a method for cropping one or more images, according to an embodiment of the present disclosure.

Referring to FIG. 13, operation S1302, a method 1300 includes detecting the number objects in each image. Accordingly, the processor 202 may detect the number of objects in each image. In operation S1304, the method 1300 includes determining the relative scaling factor for each image based on the number of objects. Accordingly, the processor 202 may determine the relative scaling factor for each image based on the number of objects.

In operation S1306, the method 1300 includes cropping one or more images based on the relative scaling factor for each image. Accordingly, the processor 202 may crop one or more images based on the relative scaling factor for each image. In operation S1308, the method 1300 includes displaying one or more resized images on the screen of the electronic device 100. Accordingly, the processor 202 may display the one or more resized images on the screen of the electronic device 100.

With the proposed method 1300, the images may be cropped based on the relative scaling factor for each image. Further, the resized images after cropping may be displayed on the screen of the electronic device 100. When the images are cropped, the user is able to fully perceive the images, and thus, the UX may be enhanced while the user views the images.

The various actions, acts, blocks, operations, or the like in the method 1300 may be performed in the presented order, in a different order or, simultaneously. Further, in some embodiments, some of the actions, acts, blocks, operations, or the like may be omitted, added, modified, skipped, or the like without departing from the scope of the present disclosure.

Figure 14A:
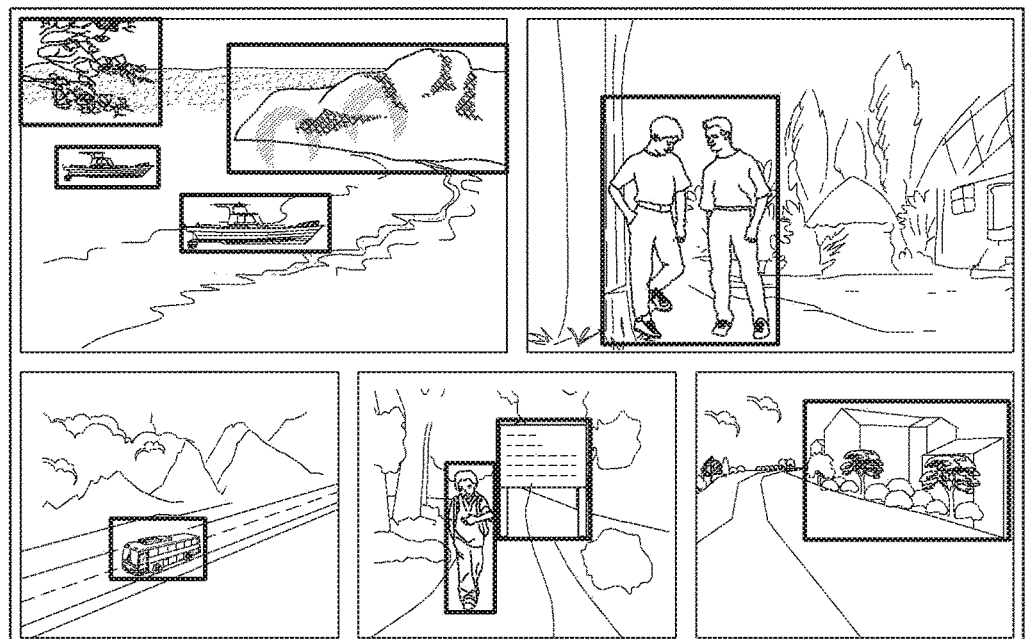
FIGS. 14A and 14B are diagrams for a comparison between the related art and the present disclosure when a plurality of images are displayed, according to various embodiments of the present disclosure.
Figure 14B:
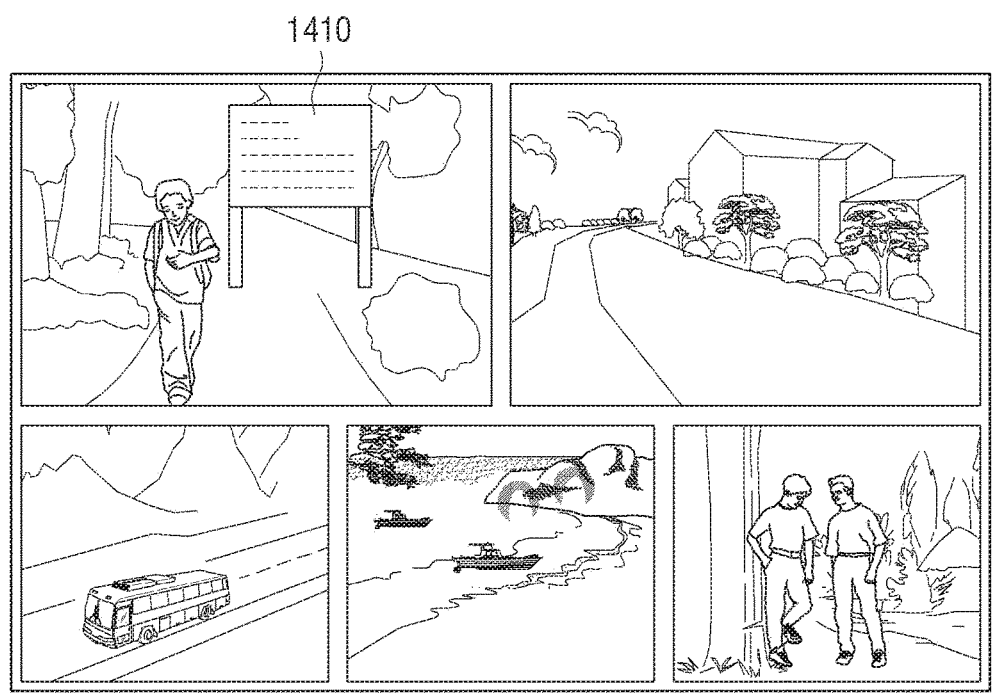

FIGS. 14A and 14B are diagrams for a comparison between the related art and the present disclosure when a plurality of images are displayed, according to various embodiments of the present disclosure.

Referring to FIG. 14A, illustrates an example where a plurality of images are displayed, in the systems according to the related art. As illustrated in FIG. 14A, cropping may be performed on the plurality of images according to an embodiment. FIG. 14B illustrates an example where the resized images after cropping are displayed. In an embodiment, a salient region detection method is used to detect a salient region in each image as shown in the FIG. 14A. The images are resized in such a way that the salient region is made more prominent or bigger. By way of example, a signpost 1410 in the first image of FIG. 14B is resized to be larger than a signpost 1410 in the fourth image of FIG. 14A, and thus, information in the image may be perceived easily. In addition, a building in the second image of FIG. 14B is resized to be larger than a building in the fifth image of FIG. 14A so as to be more clearly perceived. A bus in the third image of FIG. 14A is cropped and resized so as to be more clearly illustrated, as shown in the third image of FIG. 14B.

Figure 15:
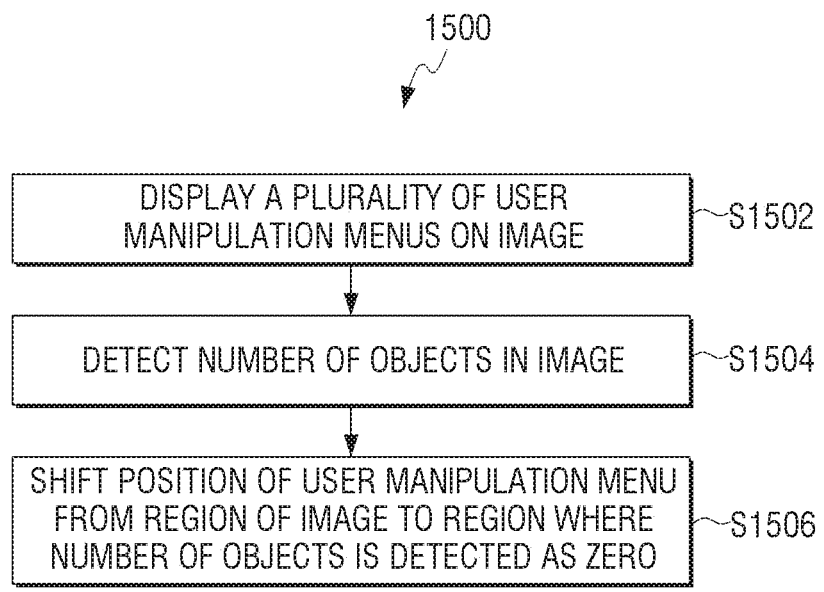
FIG. 15 is a flowchart provided to describe a method for managing display of an image in an electronic device, according to an embodiment of the present disclosure.

FIG. 15 is a flowchart provided to describe a method for managing display of an image in an electronic device, according to an embodiment of the present disclosure.

Referring to FIG. 15, operation S1502, a method 1500 includes displaying a plurality of control elements on an image. Accordingly, the processor 202 may display the plurality of control elements on the image. In operation S1504, the method 1500 includes detecting the number of objects in the image. Accordingly, the processor 202 may detect the number of objects in the image.

In operation S1506, the method 1500 includes dynamically shifting positions of one or more control elements to a region of an image where the number of objects is detected as zero. Accordingly, the processor 202 may dynamically shift the positions of one or more control elements to the region where no object is detected on the image.

With the proposed method 1500, the image control elements are displayed on the image region where the number of objects is not detected. That is, unlike the related art, the information and the objects in the image may be fully perceived as the image control elements are shifted and displayed in the image region where no object is detected.

The various actions, acts, blocks, operations, or the like in the method 1500 may be performed in the presented order, in a different order or, simultaneously. Further, in some embodiments, some of the actions, acts, blocks, operations, or the like may be omitted, added, modified, skipped, or the like without departing from the scope of the present disclosure.

Figure 16A:
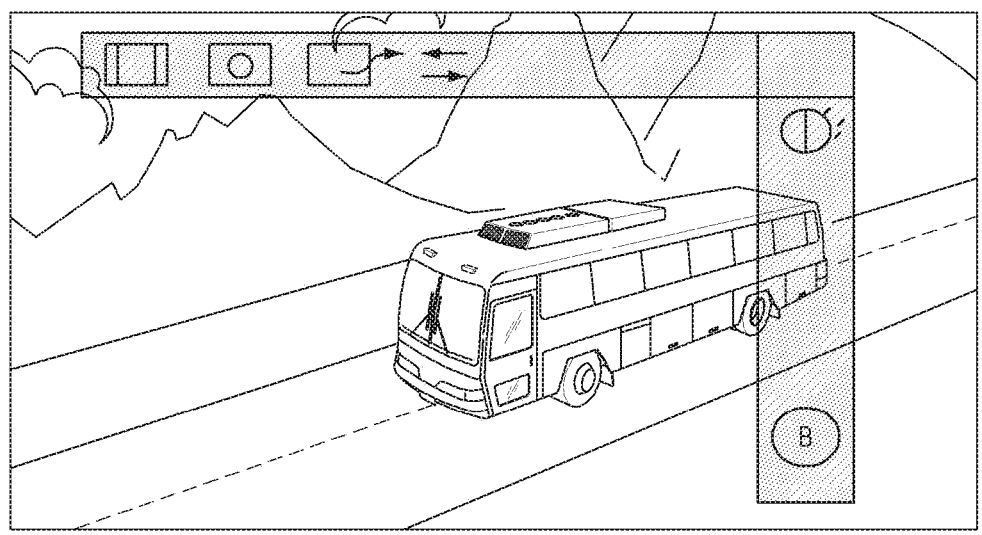
FIGS. 16A and 16B are diagrams for a comparison between the related art and the present disclosure when a user manipulation menu is displayed on an image, according to various embodiments of the present disclosure.
Figure 16B:
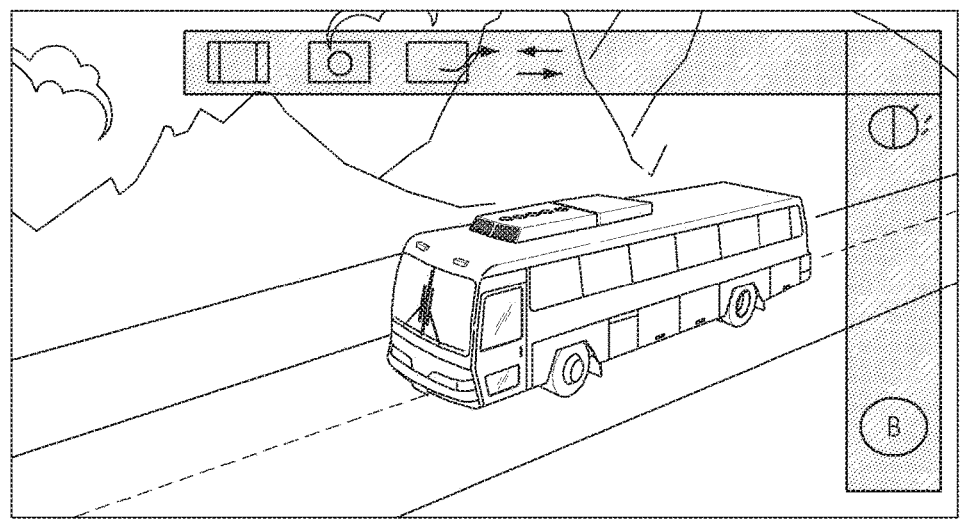

FIGS. 16A and 16B are diagrams for a comparison between the related art and the present disclosure when a user manipulation menu is displayed on an image, according to various embodiments of the present disclosure.

Referring to FIG. 16A, illustrates an example where an image editor application with image control elements is displayed, in the systems according to the related art. Referring to FIG. 16A, the image controls are spaced at default locations. When the image control elements are spaced at the default locations, the image control elements are overlaid and displayed on the image, and thus, the information or objects in the image cannot be fully perceived. FIG. 16B illustrates an example where the image control elements are shifted and displayed on an image region where no object is detected, unlike the related art. Referring to FIG. 16B, the image control elements are displayed on the image where there are no objects. That is, as opposed to the related art, the information and the objects in the image may be fully perceived when the image control elements are displayed on the region of the image where there are no objects. In a similar manner, in case of a camera view finder application, the image control elements may be displayed on a region of the image where the number of objects is detected as zero.

In this case, the image control elements may include a user manipulation menu or icons for capturing or editing an image. In response to the user manipulation menu being displayed in an individual icon form, not a menu-shaped user interface (UI), the electronic device 100 may control the display 206 to shift and display the icon in a region where the number of objects is detected as zero.

FIGS. 17A to 17D are diagrams for a comparison between the related art and the present disclosure when a caption of an image is displayed, according to various embodiments of the present disclosure.

Figure 17A:
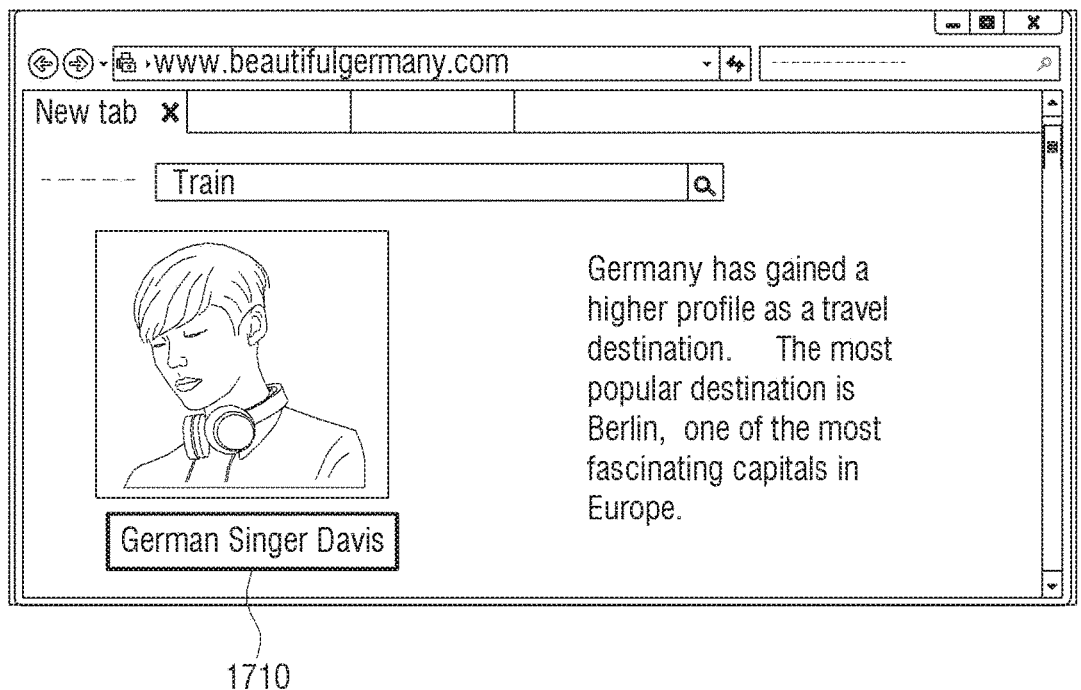
FIGS. 17A to 17D are diagrams for a comparison between the related art and the present disclosure when a caption of an image is displayed, according to various embodiments of the present disclosure.
Figure 17B:
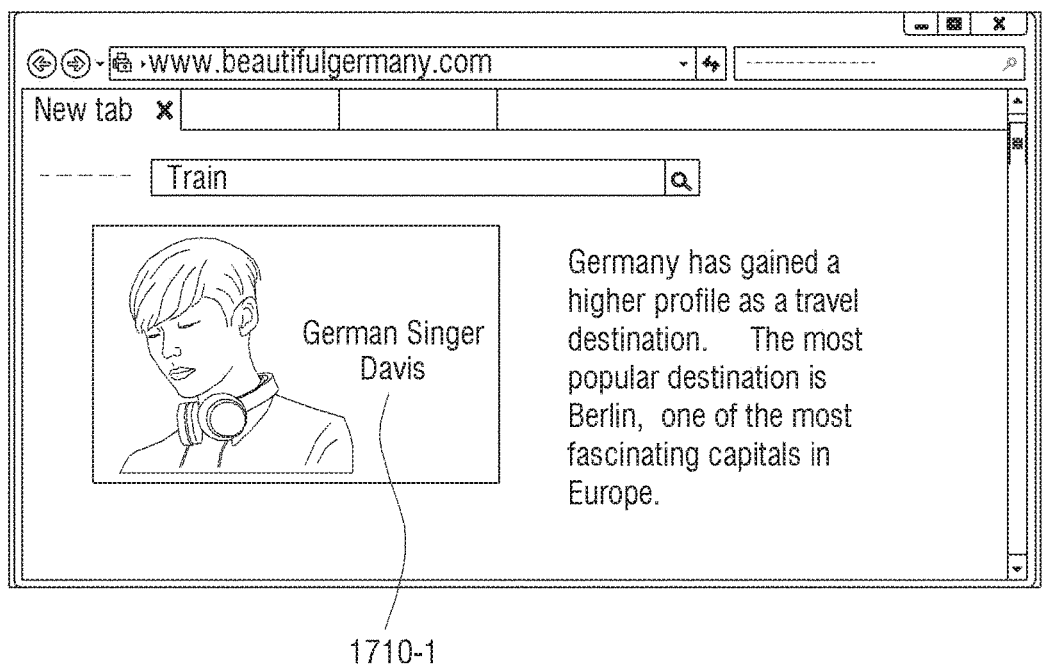

FIGS. 17A and 17B are diagrams for a comparison between the related art and the present disclosure when a caption of an image is displayed in a web page, according to various embodiments of the present disclosure.

Referring to FIG. 17A, illustrates an example where a caption 1710 of an image is displayed below the image, in the systems according to the related art. FIG. 17B illustrates an example where a caption 1710-1 of an image is overlaid on the image, unlike the systems according to the related art. In an embodiment, an appropriate location of the caption (for example, text) to be overlaid on the image is determined as a region where no object is detected. As the caption is overlaid on the image, the image may be resized and displayed to be larger.

In an embodiment, the processor 202 may determine a font color and size appropriate for overlaying the caption on the image. For example, the font color of the caption may be determined to be contrast to a color of a background image. In addition, elements for determining a style of the caption may be updated automatically or by a user command.

Figure 17C:
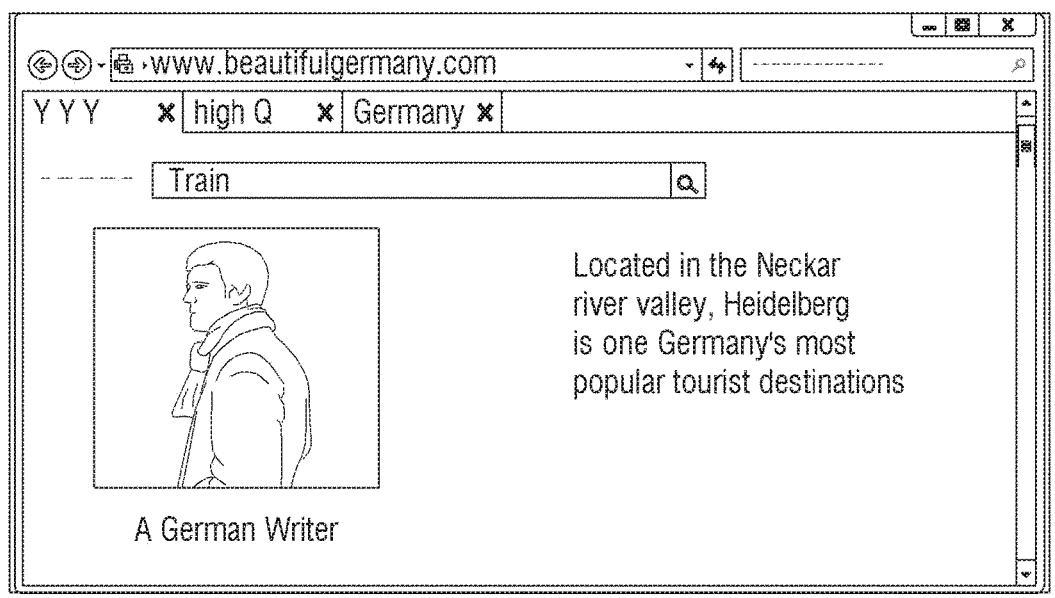
Figure 17D:
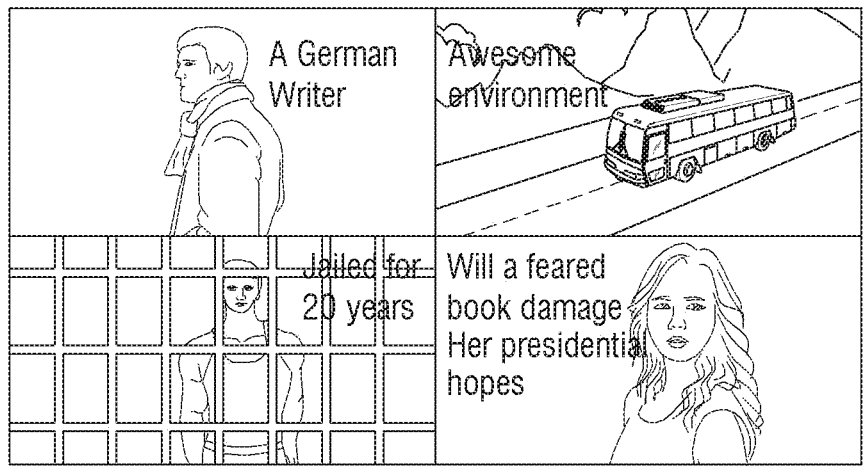

FIGS. 17C and 17D are diagrams for another comparison between the related art and the present disclosure when a caption of an image is displayed, according to various embodiments of the present disclosure.

Referring to FIG. 17C, illustrates an example where a caption of an image is displayed below the image, in the systems according to the related art. FIG. 17D illustrates a plurality of images where captions of the images are overlaid on the images according to an embodiment. For example, as illustrated in FIG. 17D, when there are a plurality of images where captions of the images are overlaid in a web page, the processor 202 may display the display 206 to display the plurality of images where the captions are overlaid in a form of a gallery. In addition, the processor 202 may resize the plurality of images displayed in the form or gallery based on the number of objects in each image.

Figure 18A:
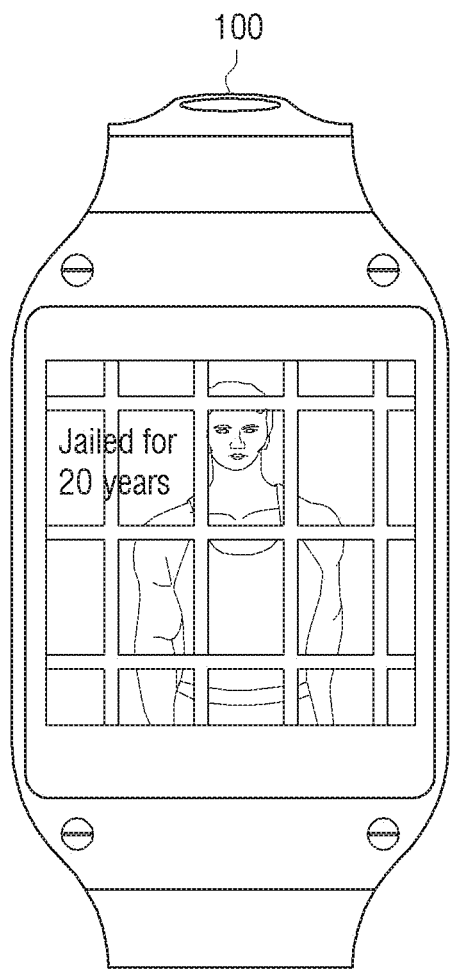
FIGS. 18A and 18B are diagrams illustrating an example of a browsing operation on an image using a caption in a wearable device, according to various embodiments of the present disclosure.
Figure 18B:
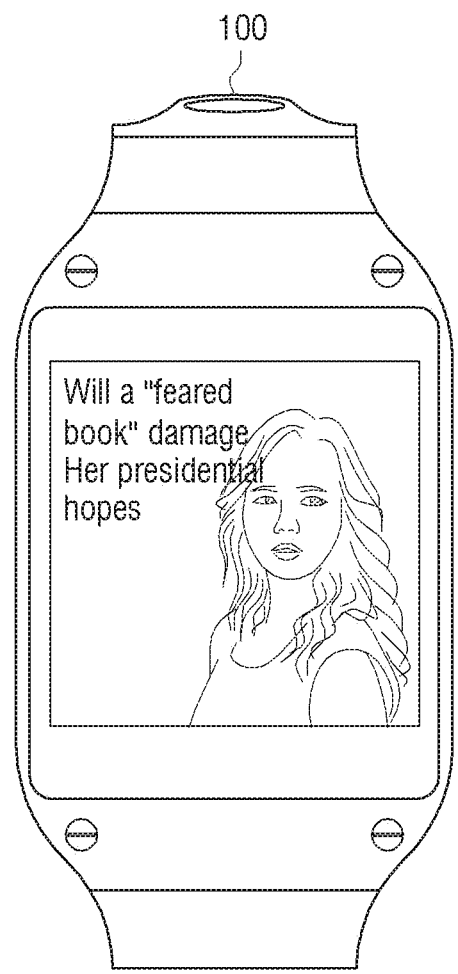

FIGS. 18A and 18B are diagrams illustrating an example of a browsing operation on an image using a caption in a wearable device, according to various embodiments of the present disclosure.

Referring to FIGS. 18A and 18B, a web site related to the caption may be searched by using the caption overlaid on the image, in an electronic device 100, which may be a wearable device. For example, in the electronic device 100, which may be a wearable device, an image with a caption may be displayed such that the caption is overlaid on the image. In this case, the image may be resized to be larger as the caption is overlaid on the image. Related content may be searched in the web site automatically or by clicking the caption overlaid on the image by the user.

Figure 19:
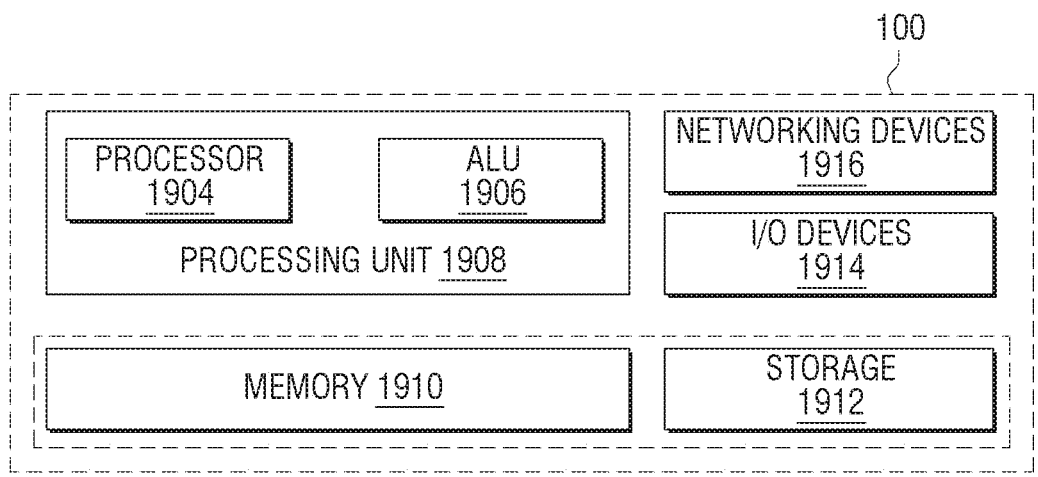
FIG. 19 is a diagram illustrating a computing environment implementing a method for displaying a plurality of images in an electronic device, according to an embodiment of the present disclosure.

FIG. 19 is a diagram illustrating a computing environment implementing a method for displaying a plurality of images in an electronic device, according to an embodiment of the present disclosure.

Referring to FIG. 19, a computing environment of the electronic device 100 includes a processor 1904, an arithmetic logic unit (ALU) 1906, a memory 1910, a storage 1912, a plurality of networking devices 1916, and a plurality input/output (I/O) devices 1914. A processing unit 1908 is responsible for processing the instructions of the schemes. The processing unit 1908 receives commands from the processor 1904 in order to process the instructions. Further, any logical and arithmetic operations involved in the execution of the instructions are computed with the help of the ALU 1906.

The overall computing environment of the electronic device 100 may be composed of multiple homogeneous and/or heterogeneous cores, multiple central processing units (CPUs) of different kinds, special mediums, and other accelerators. The processing unit 1908 is responsible for processing the instructions of the scheme. Further, the plurality of processing unit 1908 may be located on a single chip or over multiple chips.

The scheme including the instructions and codes used for the implementation is stored in either the memory 1910 or the storage 1912 or both. At the time of execution, the instructions may be fetched from the corresponding memory 1910 or storage 1912 and executed by the processing unit 1908.

In case of any hardware implementations, various networking devices 1916 or I/O devices 1914 may be external and may be connected to the computing environment for supporting the implementation through a communicator (not shown) and an I/O device unit (not shown).

The embodiments disclosed herein may be implemented through one or more software programs running on at least one hardware device and performing network management functions to control the elements. The elements shown in the FIGS. 1A, 1B, 2 to 5, 6A, 6B, 7A, 7B, 8A to 8J, 9, 10A, 10B, 11, 12A, 12B, 13, 14A, 14B, 15, 16A, 16B, 17A to 17D, 18A, 18B, 19, and 20 include blocks which may be at least one hardware device, a hardware device, or a combination of software module.

Figure 20:
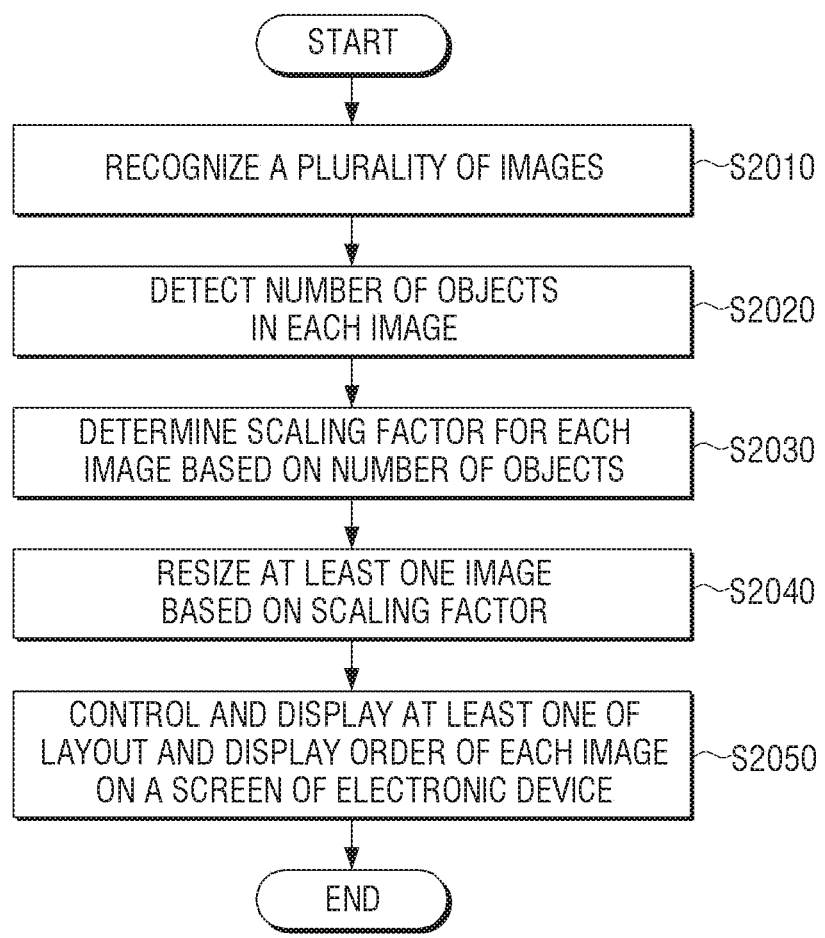
FIG. 20 is a sequence diagram provided to describe a method for resizing and displaying images according to the number of objects included in each of a plurality of images, according to an embodiment of the present disclosure.

FIG. 20 is a sequence diagram provided to describe a method for resizing and displaying images according to the number of objects included in each of a plurality of images, according to an embodiment of the present disclosure.

In operation S2010, the electronic device 100 recognizes a plurality of images. For example, when a new image is stored in an application that stores a plurality of images, for example, a gallery application, the electronic device 100 may recognize the new image.

When the images are images stored in the electronic device 100, the electronic device 100 may recognize the images before the images are stored in the electronic device 100. When the images are images uploaded in real time through a web browser, such as, a web site, the electronic device 100 may recognize the images while the images are uploaded.

In operation S2020, the electronic device 100 detects the number of objects in each image. For example, the electronic device 100 may detect the objects in each image (for example, faces) by executing a program, such as, a face detector, on the recognized images. The electronic device 100 may obtain the number of faces in each image by detecting the faces through a bounding box for each face. The electronic device 100 may store coordinate values of the bounding box and the number of faces as metadata, along with image files.

In operation S2030, the electronic device 100 may determine a scaling factor for each image based on the number of objects in each image. For example, the scaling factor may be an element for determining a resizing ratio of each image. By way of example, the resizing ratio may be a value obtained by dividing a face region on an image by an entire image region.

In addition, the electronic device 100 may determine the scaling factor according to the number of objects in each image by using at least one of the color contrast, edge density, Bayesian integration, and Superficial Straddling.

In addition, the electronic device 100 may determine the scaling factor by using salient regions, contrast, and gradient based on the objects in each image.

The electronic device 100 may store information on the determined scaling factor as the metadata.

In operation S2040, the electronic device 100 may resize one or more images among the plurality of images based on the scaling factor. The operation of resizing images based on the number of objects has been described above in detail, and thus, a detailed description thereof will be omitted.

In operation S2050, the electronic device 100 may control at least one of a layout and a display order of the resized images and display the resized images on a screen of the electronic device 100. For convenience in explanation, it is assumed that four images include different number of objects (for example, the number of persons), respectively. For example, in the related art, the gallery application may display four images in a screen in the same size. As opposed to the related art, according to an embodiment disclosed herein, four images may be resized and displayed to be in different sizes according to the number of objects in each image. In this case, a layout of each image may be changed within a layout for displaying the four images, and a display order of each image may be also changed.

As the four images are resized, the four images may be arranged so as to form an empty space in the layout for displaying all of the four images. In this case, the electronic device 100 may display additional images in the space, and thus, more images may be displayed. Accordingly, the electronic device 100 may resize the images such that the objects in each image are shown clearly or may provide the user with more information through the additional images.

As another example, the electronic device 100 may select and display an image where the objects are shown clearly from among the four images. For example, the electronic device 100 may display three images in the layout for displaying four images. Accordingly, the electronic device 100 may provide the user with object information included in the images more clearly thereby enhancing the UX.

According to an embodiment, the processor 202 may include a RAM, a read-only memory (ROM), a graphic processor, a main CPU, first to n(th) interfaces, and a bus. The RAM, the ROM, the graphic processor, the main CPU, and the first to n(th) interfaces may be interconnected through the bus.

The RAM stores an operating system (O/S) and application programs. To be specific, when the electronic device 100 is booted up, the O/S is stored in the RAM, and diverse application data selected by the user may be stored in the RAM.

The ROM stores a set of commands for system booting. In response to power being supplied by a turn-on command, the main CPU copies the O/S stored in the memory to the RAM according to the commands in the ROM, and boots up a system by executing the O/S. Upon completion of the boot-up operation, the main CPU copies various application programs in the memory to the RAM and executes the application programs copied to the RAM to perform various operations.

The main CPU accesses the memory and performs the boot-up operation by using the O/S in the memory. In addition, the main CPU performs various operations by using diverse programs, contents, and data stored in the memory.

The first to n(th) interfaces are connected to the aforementioned various components. One of the interfaces may be a network interface connected to an external device through a network.

The devices (for example, modules or the electronic device 100) or methods (for example, actions) according to various embodiments disclosed herein may be executed by at least one computer (for example, the processor 202) that executes the instructions included in at least one program among programs maintained in a computer-readable storage media.

When the instructions are executed by the computer (for example, the processor 202), the at least one computer may perform functions corresponding to the instructions. In this case, the computer-readable storage media may be the memory, for example.

For example, the programs may be included in the computer-readable storage media, such as, hard discs, floppy discs, magnetic media (for example, magnetic tapes), optical media (for example, compact disc ROM (CD-ROM) or digital versatile disk (DVD), magneto-optical media (for example, floptical disk), hardware devices (for example, ROM, RAM, or flash memories), or the like.

The storage media is included in the electronic device 100 as a part of the components thereof generally. However, the storage media may be mounted through a port of the electronic device 100 or may be included in an external device located outside the electronic device 100 (for example, cloud, servers, or other electronic devices). In addition, the programs may be distributed to a plurality of storage media. In this case, at least a part of the plurality of storage media may be located in the external device of the electronic device 100.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for processing an image, the electronic device comprising:
    a display configured to display a plurality of images on a screen; and
    at least one processor configured to:
        detect a number of objects included in each of the plurality of images,
        determine a scaling factor for at least one image among the plurality of images based on the detected number of objects,
        resize the at least one image with a larger number of objects to be larger than an image with a smaller number of objects among the plurality of images based on the determined scaling factor for the at least one image, and
        control at least one of a layout or a display order of the plurality of images based on the at least one resized image and control the display to display the plurality of images.

2. The electronic device of claim 1, wherein the at least one processor is further configured to control the display to selectively display at least one image where objects of the at least one image occupy a high proportion in the at least one image from among the at least one resized image.

3. The electronic device of claim 1, wherein the at least one processor is further configured to:
    determine a region of interest (ROI) for each of the plurality of images,
    crop a region where at least one object is included out of at least one image among the plurality of images based on the determined ROI for each of the plurality of images, and
    control the display to display an image of the cropped region.

4. The electronic device of claim 1, wherein, in response to an image being selected from among the plurality of images and a user manipulation menu being overlaid and displayed on the selected image, the at least one processor is further configured to control the display to display the user manipulation menu in a region where the objects are not detected.

5. The electronic device of claim 1, wherein the at least one processor is further configured to:
    divide a region where the plurality of images are displayed into a number of designated tiled forms, and
    control the display to re-render and display the plurality of images including the at least one resized image in the number of designated tiled forms.

6. The electronic device of claim 1, wherein, in response to at least one object being included in an image and a caption for describing the image being displayed, the at least one processor is further configured to:
    overlay the caption on the image, and
    control the display to display the image.

7. The electronic device of claim 1, wherein the at least one processor is further configured to determine the scaling factor by comparing the number of objects included in each of the plurality of images.

8. The electronic device of claim 1, wherein the at least one processor is further configured to detect the objects by using at least one of color contrast, edge density, Bayesian integration or Superficial Straddling.

9. The electronic device of claim 1, further comprising:
    a storage unit,
    wherein the at least one processor is further configured to:
        determine the number of objects included in a first image when the first image is stored in the storage unit, and
        store the determined number objects of the first image in the storage unit along with the first image,
        determine the number of objects included in a second image when the second image is loaded, and
        store the determined number of objects of the second image in the storage unit along with information on the second image.

10. A method for processing an image in an electronic device, the method comprising:
    recognizing a plurality of images in the electronic device;
    detecting a number of objects included in each of the plurality of images;
    determining a scaling factor for at least one image among the plurality of images based on the detected number of objects;
    resizing the at least one image with a larger number of objects to be larger than an image with a smaller number of objects among the plurality of images based on the determined scaling factor for the at least one image;
    controlling at least one of a layout or a display order of the plurality of images based on the at least one resized image; and
    displaying the plurality of images on a screen of the electronic device.

11. The method of claim 10, wherein the displaying of the plurality of images comprises selectively displaying at least one image where objects of the at least one image occupy a high proportion in the at least one image from among the at least one resized image.

12. The method of claim 10, further comprising:
    determining a region of interest (ROI) for each of the plurality of images;
    cropping a region where at least one object is included out of at least one image among the plurality of images based on the determined ROI for each of the plurality of images; and
    displaying an image of the cropped region.

13. The method of claim 10, further comprising:
    displaying, in response to an image being selected from among the plurality of images, and a user manipulation menu being overlaid and displayed on the selected image, the user manipulation menu in a region where the objects are not detected.

14. The method of in claim 10, further comprising:
    dividing a region where the plurality of images are displayed into a number of designated tiled forms; and re-rendering and displaying the plurality of images including the at least one resized image in the number of designated tiled forms.

15. The method of claim 10, further comprising:
overlaying, in response to at least one object being included in an image, and a caption for describing the image being displayed, the caption on the image and displaying the image.

16. The method of claim 10, wherein the determining of the scaling factor comprises determining the scaling factor by comparing the number of objects included in each of the plurality of images.

17. The method of claim 10, wherein the detecting comprises detecting the objects by using at least one of color contrast, edge density, Bayesian integration or Superficial Straddling.

18. The method of claim 10, further comprising:
determining, in response to a first image being stored in the electronic device, the number of objects included in the first image when the first image is stored in the electronic device and storing the determined number objects of the first image in the electronic device along with the first image; and
determining, in response to a second image being loaded in the electronic device, the number of objects included in the second image when the second image is loaded and storing the determined number of objects of the second image in the electronic device along with information on the second image.

* * * * *